US009525965B2

(12) United States Patent
Gunnarsson et al.

(10) Patent No.: US 9,525,965 B2
(45) Date of Patent: Dec. 20, 2016

(54) LOCALIZATION CONFIGURATION TO MAKE LOCATION INFORMATION AVAILABLE IN USER EQUIPMENT

(71) Applicant: TELEFONAKTIEBOLAGET L M ERICSSON (PUBL), Stockholm (SE)

(72) Inventors: Fredrik Gunnarsson, Linköping (SE);
Henrik Enbuske, Stockholm (SE);
Iana Siomina, Solna (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 65 days.

(21) Appl. No.: 13/823,970

(22) PCT Filed: Dec. 17, 2012

(86) PCT No.: PCT/SE2012/051407
§ 371 (c)(1),
(2) Date: Mar. 15, 2013

(87) PCT Pub. No.: WO2013/172758
PCT Pub. Date: Nov. 21, 2013

(65) Prior Publication Data
US 2014/0179345 A1 Jun. 26, 2014

Related U.S. Application Data

(60) Provisional application No. 61/646,819, filed on May 14, 2012.

(51) Int. Cl.
*H04W 4/02* (2009.01)
*H04W 4/20* (2009.01)
H04W 24/10 (2009.01)

(52) U.S. Cl.
CPC ............... *H04W 4/02* (2013.01); *H04W 4/20* (2013.01); *H04W 24/10* (2013.01)

(58) Field of Classification Search
CPC .................. H04W 24/00–24/10; H04W 16/18; H04W 4/025; H04W 64/00
(Continued)

(56) References Cited

U.S. PATENT DOCUMENTS

2004/0267445 A1* 12/2004 De Luca ................. H04W 4/02
701/408
2007/0197209 A1* 8/2007 Hashimoto et al. ....... 455/426.1
(Continued)

FOREIGN PATENT DOCUMENTS

WO  2010087625 A2  8/2010
WO  2011120585 A1  10/2011
(Continued)

OTHER PUBLICATIONS

Khan, A., et al., "LRFP: An RF Coverage Reporting Protocol for LTE Systems", IEEE Wireless Communications, Dec. 2011, pp. 64-72, vol. 18, No. 6, IEEE Service Center, NJ, US.
(Continued)

*Primary Examiner* — George Eng
*Assistant Examiner* — Umair Ahsan
(74) *Attorney, Agent, or Firm* — Coats & Bennett, PLLC

(57) ABSTRACT

A method of generating location information in a terminal device (200) operative in a wireless communication network is disclosed. The terminal device receives (248) from a first network node (210) a location configuration message. As a result, the terminal device prepares (252) location information but refrains (254) from causing transmission of the location information to the first network node. Instead, the terminal device may transmit the prepared location information to a location information receiving network node (230) different from the first network node (210), to a location information receiving function within the terminal device, or to a location information receiving device (152), (Continued)

operative in the wireless communication network and different from the terminal device (200).

38 Claims, 14 Drawing Sheets

(58) Field of Classification Search
USPC .... 455/422.1, 423–424, 456.1, 456.2, 456.5, 455/456.6, 67.11
See application file for complete search history.

(56) References Cited

U.S. PATENT DOCUMENTS

| | | | |
|---|---|---|---|
| 2012/0190364 A1* | 7/2012 | Wu | H04W 24/10 455/436 |
| 2013/0137460 A1* | 5/2013 | Bodog et al. | 455/456.2 |
| 2014/0317456 A1* | 10/2014 | Kim et al. | 714/48 |

FOREIGN PATENT DOCUMENTS

| | | |
|---|---|---|
| WO | 2011157301 A1 | 12/2011 |
| WO | 2011162668 A1 | 12/2011 |
| WO | 2012019652 A1 | 2/2012 |
| WO | 2012052398 A1 | 4/2012 |

OTHER PUBLICATIONS

3rd Generation Partnership Project, "Technical Specification Group Radio Access Network; Evolved Universal Terrestrial Radio Access Network (E-UTRAN); Stage 2 functional specification of User Equipment (UE) positioning in E-UTRAN (Release 10)", Technical Specification,3GPP TS 36.305 V10.3.0, Sep. 1, 2011, pp. 1-51, 3GPP, France.

3rd Generation Partnership Project, "Technical Specification Group Radio Access Network; Evolved Universal Terrestrial Radio Access (E-UTRA); Radio Resource Control (RRC); Protocol specification (Release 10)", Technical Specification, 3GPP TS 36.331 V10.5.0, Mar. 1, 2012, pp. 1-302, 3GPP, France.

3rd Generation Partnership Project, "Technical Specification Group Radio Access Network; Evolved Universal Terrestrial Radio Access (E-UTRA); LTE Positioning Protocol (LPP) (Release 10)", Technical Specification, 3GPP TS 36.355 V10.4.0, Dec. 1, 2011, pp. 1-116, 3GPP, France.

3rd Generation Partnership Project, "Technical Specification Group Core Network and Terminals; Location Services (LCS); LCS Application Protocol (LCS-AP) between the Mobile Management Entity (MME) and Evolved Serving Mobile Location Centre (E-SMLC); SLs interface (Release 11)", Technical Specification, 3GPP TS 29.171 V11.1.0, Mar. 1, 2012, pp. 1-51, 3GPP, France.

Medbo, J. et al., "Propagation Channel Impact on LTE Positioning Accuracy—A Study Based on Real Measurements of Observed Time Difference of Arrival", Ericsson Research, Conference Publication, 20th International Symposium on Personal, Indoor and Mobile Radio Communications, Sep. 13, 2009, pp. 2213-2217, IEEE, Tokyo, JP.

Federal Communications Commission, "Third Report and Order", FCC 99-245, Oct. 6, 1999, pp. 1-57, [Retrieved on Mar. 25, 2013], Retrieved from Internet: http://transition.fcc.gov/Bureaus/Wireless/Orders/1999/fcc99245.pdf.

3rd Generation Partnership Project, "Technical Specification Group Radio Access Network; Study on Minimization of drive-tests in Next Generation Networks; (Release 9)", Technical Specification, 3GPP TR 36.805 V9.0.0, Dec. 1, 2009, pp. 1-24, 3GPP, France.

3rd Generation Partnership Project, "Technical Specification Group Core Network and Terminals; Location Services (LCS); LCS Application Protocol (LCS-AP) between the Mobile Management Entity (MME) and Evolved Serving Mobile Location Centre (E-SMLC); SLs interface (Release 10)", Technical Specification, 3GPP TS 29.171 V10.1.0, Sep. 1, 2010, pp. 1-51, 3GPP, France.

3rd Generation Partnership Project, "Technical Specification Group Radio Access Network; Evolved Universal Terrestrial Radio Access Network (E-UTRAN); Stage 2 functional specification of User Equipment (UE) positioning in E-UTRAN (Release 9)", Technical Specification, 3GPP TS 36.305 V9.2.0, Mar. 1, 2010, pp. 1-52, 3GPP, France.

3rd Generation Partnership Project, "Technical Specification Group Radio Access Network; Evolved Universal Terrestrial Radio Access Network (E-UTRAN); Stage 2 functional specification of User Equipment (UE) positioning in E-UTRAN (Release 9)", Technical Specification, 3GPP TS 36.305 V9.4.0, Sep. 1, 2010, pp. 1-52, 3GPP, France.

3rd Generation Partnership Project, "Technical Specification Group Radio Access Network; Evolved Universal Terrestrial Radio Access (E-UTRA); LTE Positioning Protocol (LPP) (Release 9)", Technical Specification, 3GPP TS 36.355 V9.3.0, Sep. 1, 2010, pp. 1-113, 3GPP, France.

3rd Generation Partnership Project, Technical Specification Group Radio Access Network; Evolved Universal Terrestrial Radio Access (E-UTRA); LTE Positioning Protocol A (LPPa) (Release 9), Technical Specification, 3GPP TS 36.455 V9.3.0, Sep. 1, 2010, pp. 1-52, 3GPP, France.

Ericsson, "pCR to shadow TS 32.422 for MDT, Coordination of network based localization with MDT", 3GPP TSG-SA5 (Telecom Management) Virtual Meeting, Management of UE based network performance measurements, S5UEPM0016, Jun. 16, 2010, pp. 1-5, 3GPP, [Retrieved on Mar. 25, 2013], Retrieved from Internet: http://www.3gpp.org/ftp/tsg_sa/wg5_tm/Ad-hoc_meetings/Virtual-UE-PM/DocumentList.htm.

Next Generation Mobile Networks Project 12, "Informative List of SON Use Cases", Annex A (informative) of "Use Cases related to Self Organising Network. Overall Description.", Apr. 16, 2007, pp. 1-36, Version 1.53, NGMN, Germany.

* cited by examiner

Generating location information in a terminal device operative in a wireless communication network In the terminal device:

In the first network node:

In a second network node:

LOCALIZATION CONFIGURATION TO MAKE LOCATION INFORMATION AVAILABLE IN USER EQUIPMENT

CROSS-REFERENCE TO RELATED APPLICATIONS

This application is the National Stage of International App. No. PTC/SE2012/051407, filed Dec. 17,2012, which claims priority under 35 U.S.C. §119(e) to U.S. Prov. App. No. 61/646,819, filed on May 14, 2012, all of which are entitled "LOCATIONALIZATION CONFIGURATION TO MAKE LOCATION INFORMATION AVALABLE IN USER EQUIPMENT," and all of which are hereby incorporated by reference as if fully set forth herein.

TECHNICAL FIELD

The present disclosure generally relates to wireless communications, and in particular to methods of generating location information in a terminal device operative in a wireless communication network. The present disclosure also relates to a corresponding terminal device and corresponding network nodes, and to corresponding computer readable storage media.

BACKGROUND

Wireless communication networks are ubiquitous in many parts of the world. Wireless communication networks are complex entities and require considerable manual effort by network operators in planning, configuring, optimizing, and maintaining the wireless access networks. These efforts can consume a great part of their operational expenditures (OPEX).

The Universal Mobile Telecommunications System (UMTS) is a third generation mobile cellular technology developed by the 3rd Generation Partnership Project (3GPP). The air interface of the 3GPP Long Term Evolution (LTE) migration path for the future of wireless communication is the Evolved UMTS Terrestrial Radio Access Network (E-UTRAN). One important E-UTRAN goal from the network operators' perspective is a significant reduction of the Manual effort in the deployment, configuration, and optimization phases for this future wireless access system. See Next Generation Mobile Networks (NGMN), "Operator Use Cases related to Self Organising Networks," ver. 1.53, 2007-04-16, the disclosure of which is incorporated herein by reference.

This involves automation of the tasks typically involved in operating a network, e.g., planning, verification—for example, by drive/walk testing—and optimization.

Currently, wireless network operators resort to planning tools to dimension and plan their networks according to a specific business strategy. The approach based on planning tools and prediction, however, is not fully accurate. Some reasons for the inaccuracies include imperfections in the geographic data used, simplifications and approximations in the applied propagation models, and changes in the environment, e.g., construction/demolition or seasonal effects (foliage changes). Furthermore, changes in the traffic distribution and user profiles can lead to inaccurate prediction results. These shortcomings force operators to continuously optimize their networks using measurements and statistics, and to perform drive/walk tests. Drive/walk testing provides a picture of the end user perception in the field and enables the operator to identify locations exhibiting poor performance and their corresponding cause (e.g., incorrect tilt or handover settings). Drive/walk tests, however, are not ideal since only a limited part of the network can be analyzed due to access restrictions and the cost and time involved. Further, only a snapshot in time of the conditions in the field is captured.

One method for overcoming these difficulties is to utilize the User Equipment (UE) to report the observed service quality along with the locations where the measurements are taken. The standardization of such UE reports is currently being carried out in 3GPP. See 3GPP TR 36.805, "Study on Minimization of drive-tests in Next Generation Networks", Version 9.0.0, December 2009, the disclosure of which is incorporated herein by reference. These UE reports can be used by a function which continuously monitors the network and estimates the spatial network performance, e.g., coverage and throughput. This is referred to as Minimization of Drive Tests (MDT) functionality.

In order to keep the time it takes to compile information about a service area short, an extensive number of measurement reports are needed. This means extensive load over the localization protocols and participating nodes, which can become the limiting factor, particularly when multiple UEs are performing MDT measurements.

The background section of this document is provided to place embodiments of the present disclosure in technological and operational context, to assist those of skill in the art in understanding their scope and utility. Unless explicitly identified as such, no statement herein is admitted to be prior art merely by its inclusion in the background section.

SUMMARY

The following presents a simplified summary of the disclosure in order to provide a basic understanding to those of skill in the art. This summary is not an extensive overview of the present disclosure and is not intended to identify key/critical elements of embodiments of the present disclosure or delineate the broadest scope of the present disclosure. The sole purpose of this summary is to present some concepts disclosed herein in a simplified form as a prelude to the more detailed description that is presented later.

One understanding that embodiments of the present disclosure are based on is that improvements can be achieved in a wireless communication network by making location configuration of a target terminal device from a first network node in a way such that the target terminal device is configured to prepare and make location information available, but without the first network node receiving location information in return. Instead, the target terminal device may transfer the prepared location information to a different network node, to a different device or to a function inside the target terminal device. In this manner, the benefits of the configuration flexibility of the first network node configuration capabilities are utilized, while utilizing efficient report signaling between the target terminal device and the recipient.

A first aspect therefore is a method of generating location information in a terminal device operative in a wireless communication network. The method is performed by the terminal device and involves receiving a location configuration message from a first network node, preparing location information, and refraining from causing transmission of the location information to the first network node. In one or more embodiments, the wireless communication network may for instance be LTE/EPC (Evolved Packet Core)/E-UTRAN compliant, the terminal device may be a UE and the first network node may be an Evolved Serving Mobile Location Center (E-SMLC). The location configuration message may for instance be an LTE Positioning Protocol (LPP) message. The location information may for instance comprise Global Navigation Satellite System (GNSS) localization data, Observed Time Difference Of Arrival (OTDOA) localization data, or Enhanced Cell ID (E-CID) localization data. The location information may for instance comprise a location estimate (i.e. an actual estimation of the position of the device), and/or location-related measurement values which can be used in computing the position of the device.

"Refraining from causing transmission of the location information to the first network node" means that the terminal device takes an active decision, based on the received location configuration message, not to transmit the prepared location information in return to the first network node.

Additional features, being beneficial but optional, of the first aspect will appear from the following detailed disclosure, from the attached dependent claims as well as from the drawings.

A second aspect is a method, by a first network node in a wireless communication network, of generating location information in a terminal device operative in the wireless communication network. The method involves sending to the terminal device a location configuration message operative to cause the terminal device to prepare location information but refrain from causing transmission of the location information to the first network node.

Additional features, being beneficial but optional, of the second aspect will appear from the following detailed disclosure, from the attached dependent claims as well as from the drawings.

A third aspect is a method, by a second network node in a wireless communication network, of generating location information in a terminal device operative in the wireless communication network. The method involves configuring a first network node to send to the terminal device a location configuration message operative to cause the terminal device to prepare location information but refrain from causing transmission of the location information to the first network node.

Additional features, being beneficial but optional, of the third aspect will appear from the following detailed disclosure, from the attached dependent claims as well as from the drawings.

A fourth aspect is a terminal device for operation in a wireless communication network. The terminal device has radio circuitry for communication with the wireless communication network, a memory and a processing unit. The radio circuitry is configured to receive a location configuration message from a first network node in said wireless communication network. The processing unit is configured to prepare location information but refrain from causing transmission of the location information in return to the first network node. The terminal device may, for instance, be a user equipment, UE, in some embodiments; however, the term "terminal device" as used herein shall expressly not be construed as being limited to any particular kind or implementation.

The terminal device according to the fourth aspect may be seen as a structural counterpart of the functionality provided by the method according to the first aspect, and may therefore have the same of structurally corresponding additional features as the latter.

A fifth aspect is an apparatus for use as a first network node in a wireless communication network. The apparatus has communication circuitry for communication with a terminal device via the wireless communication network, a memory and a processing unit. The communication circuitry is configured to send to the terminal device a location configuration message operative to cause the terminal device to prepare location information but refrain from causing transmission of the location information to the first network node. The apparatus may, for instance, be an Evolved Serving Mobile Location Center, E-SMLC, in some embodiments; however, the apparatus shall expressly not be construed as being limited to any particular kind or implementation.

The apparatus according to the fifth aspect may be seen as a structural counterpart of the functionality provided by the method according to the second aspect, and may therefore have the same of structurally corresponding additional features as the latter.

A sixth aspect is an apparatus for use as a second network node in a wireless communication network. The apparatus has communication circuitry for communication with a first network node in the wireless communication network, a memory and a processing unit. The communication circuitry is configured to send a location request message to the first network node, wherein the location request message is operative to cause the first network node to send to the terminal device a location configuration message operative to cause the terminal device to prepare location information but refrain from causing transmission of the location information to the first network node. The apparatus may, for instance, be a Mobility Management Entity, MME, in some embodiments; however, the apparatus shall expressly not be construed as being limited to any particular kind or implementation.

The apparatus according to the sixth aspect may be seen as a structural counterpart of the functionality provided by the method according to the third aspect, and may therefore have the same of structurally corresponding additional features as the latter.

A seventh aspect is a computer readable storage medium encoded with instructions that, when loaded and executed by a processor, cause performance of the method according to the first aspect.

An eighth aspect is a computer readable storage medium encoded with instructions that, when loaded and executed by a processor, cause performance of the method according to the second aspect.

A ninth aspect is a computer readable storage medium encoded with instructions that, when loaded and executed by a processor, cause performance of the method according to the third aspect.

Generally, all terms used in the claims are to be interpreted according to their ordinary meaning in the technical field, unless explicitly defined otherwise herein. All references to "a/an/the [element, device, component, means, step, etc]" are to be interpreted openly as referring to at least one instance of the element, device, component, means, step, etc., unless explicitly stated otherwise. The steps of any method disclosed herein do not have to be performed in the exact order disclosed, unless explicitly stated. It should be emphasized that the term "comprises/comprising" when used in this specification is taken to specify the presence of stated features, integers, steps, or components, but does not preclude the presence or addition of one or more other features, integers, steps, components, or groups thereof.

DETAILED DESCRIPTION

Figure 1:
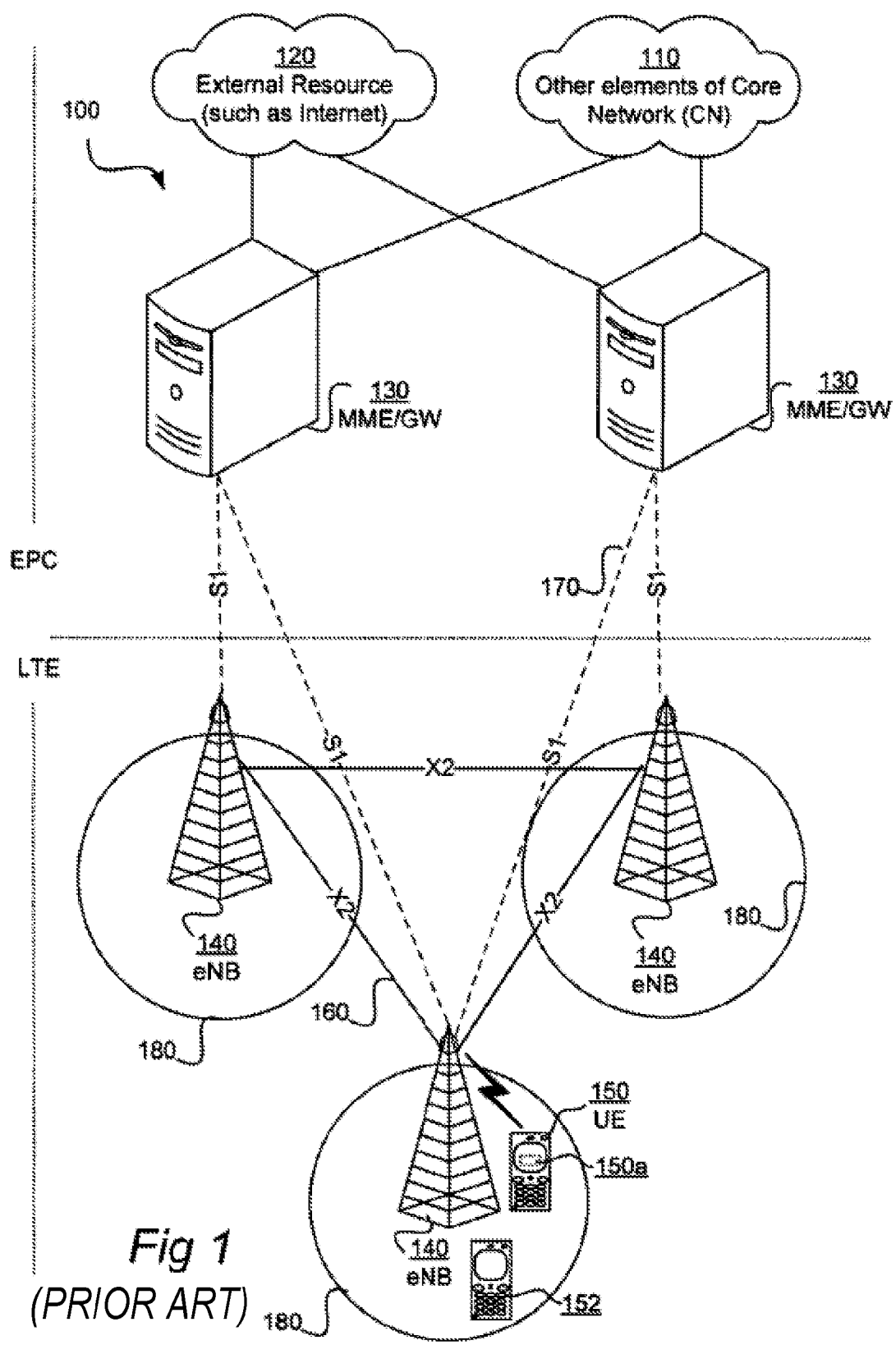
FIG. 1 is a block diagram of LTE/EPC system architecture.

Embodiments of the present disclosure will now be described with reference to the accompanying drawings. The present disclosure may, however, be embodied in many different forms and should not be construed as limited to the embodiments set forth herein; rather, these embodiments are provided so that this disclosure will be thorough and complete, and will fully convey the scope of the present disclosure to those skilled in the art. The terminology used in the detailed description of the particular embodiments illustrated in the accompanying drawings is not intended to be limiting of the present disclosure. In the drawings, like numbers refer to like elements.

The disposition of this detailed description section will be as follows.

First, with reference to FIG. 1, an exemplary wireless communication network in an LTE/EPC system architecture will be briefly described.

Following this, three different available localization (positioning) services in LTE/EPC will be briefly described with reference to FIGS. 2-7.

Then, two different available procedures for localization in conjunction with MDT measurements in LTE/EPC will be briefly described with reference to FIGS. 8 and 9.

The description of FIGS. 1 through 9 shall be seen as more of an orienting nature rather than pertaining to particulars of the disclosed embodiments—which will be described in detail with reference to the remaining drawings in FIGS. 10-22.

Starting therefore with FIG. 1, a block diagram is shown which depicts the LTE/EPC system architecture. FIG. 1 shows a schematic view of the general structure of a wireless communication network 100 in which embodiments of the present disclosure may take part. The wireless communication network 100 comprises a core network part in the form of an EPC layer, and a radio access network part in the form of an LTE layer.

The core network part comprises core network nodes 130, such as a Mobility Management Entity (MME) and/or a Gateway (GW). In FIG. 1, two such network nodes 130 are shown for pure illustrational purposes. The core network nodes 130 are configured to communicate with other core network elements (jointly referred to as 110 in FIG. 1) and/or an external resource 120 such as the Internet.

The core network nodes 130 are also configured to communicate with network nodes in the form of base stations 140 in the radio access network. In FIG. 1, each base station 140 is an Evolved Node B (eNodeB, eNB). The communication between a core network node 130 and a base station 140 is effected through a standard or protocol 170, also referred to as S1AP (S1 Application Protocol), wherein S1 denotes the interface (or reference point) between the radio access network and the core network, e.g. the interface between an eNodeB and an MME. Communication between the base stations 140 is effected through a standard or protocol 160, also referred to as X2, where proprietary messages can be added or, alternatively, the standard be extended, as appropriate for an actual implementation of the network 100. Each base station 140 is further configured to handle or service at least one cell 180. Hence, each base station 140 is configured to communicate with a number of wireless terminal devices present within its cell 180 through a wireless radio frequency protocol. In FIG. 1, two such terminal devices are shown in the form of UEs 150 and 152.

Of course, the various possible embodiments pursuant to this disclosure are not limited to the LTE/EPC architecture, but are fully applicable to other networks and standards, e.g., GSM and UMTS. The LTE/EPC architecture is used merely to illustrate embodiments to those of skill in the art, who may then readily adapt the concepts as disclosed herein to other network environments.

Localization (positioning) services in LTE/EPC will now be described with reference to FIGS. 2-7. Three different localization methods are foreseen for LTE. See 3GPP TS36.305, "Universal Terrestrial Radio Access (E-UTRA); Stage 2 functional specification of User Equipment (UE) positioning in E-UTRAN (Release 9)", Version 9.2.0, March 2010, the disclosure of which is incorporated herein by reference.

The first localization method is the network-assisted version of Global Navigation Satellite Systems (GNSSs) such as the Global Positioning System (GPS) or Galileo. Different GNSSs can be used individually or in combination with other GNSSi The network assists the UE GNSS receiver by providing assistance data (e.g., visible satellite list, clock corrections, reference positions, ephemeral data, and the like) to reduce the UE GNSS start-up and acquisition times, to increase the UE GNSS sensitivity, and to allow the UE to consume less handset power than with stand-alone GNSS. The network-assisted GNSS methods rely on signaling between UE GNSS receivers and a continuously operating GNSS reference receiver network which has clear sky visibility of the same GNSS constellation as the assisted UE. With GNSS the highest accuracy can be achieved which meets the FCC requirements. See "FCC 99-245: Third report and order", Federal Communications Commission, http://www.fcc.gov, Technical Report, October 1999, the disclosure of which is incorporated herein by reference.

The second localization method is the Observed Time Difference Of Arrival (OTDOA) method. This method utilizes the differences of time measurements of downlink radio signals from at least three eNodeBs along with the knowledge of the geographical coordinates of the measured eNodeBs and their relative downlink timing for calculating the UE position. The relative eNodeB downlink timing can be determined from information about the relation of each eNodeB downlink timing relative a time reference. One such time reference is the absolute time in the network. In order to increase the hearability of the eNodeBs a Positioning Reference Signal (PRS) with a frequency reuse of six in combination with low-interference subframes (LIS) is introduced. See J. Medbo, I. Siomina, A. Kangas, and J. Furuskog, "Propagation channel impact on LTE positioning accuracy: A study based on real measurements of observed time difference of arrival", Proc. IEEE 20$^{th}$ Int. Symposium on Personal, Indoor and Mobile Radio Communications (PIMRC '09), pp. 2213-2217, 13-16 September 2009, the disclosure of which is incorporated herein by reference.

The third localization method, the enhanced cell ID positioning (E-CID) method, uses information about the serving cell and the knowledge of the geographical coordinates of the serving eNodeB for estimating the UE position. Additional radio resource measurements like the Reference Signal Received Power (RSRP), the Reference Signal Received Quality (RSRQ) and the time difference in the UE between the start of an uplink frame transmission and a downlink frame submission can be used to improve the UE location estimate.

Figure 2:
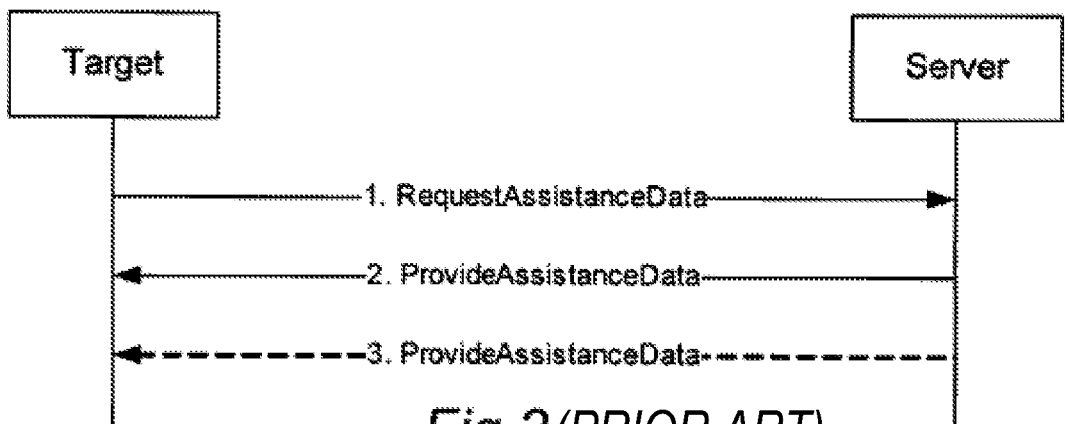
FIG. 2 is a signaling diagram for requested location assistance.
Figure 3:
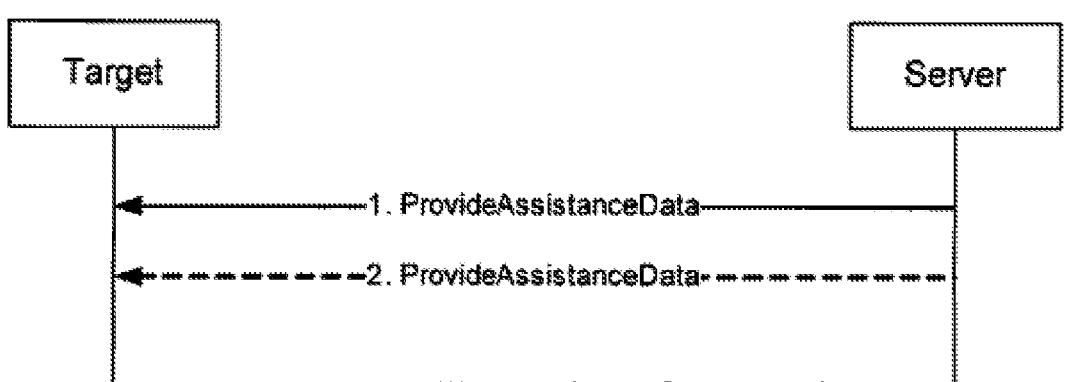
FIG. 3 is a signaling diagram for unrequested location assistance.
Figure 4:
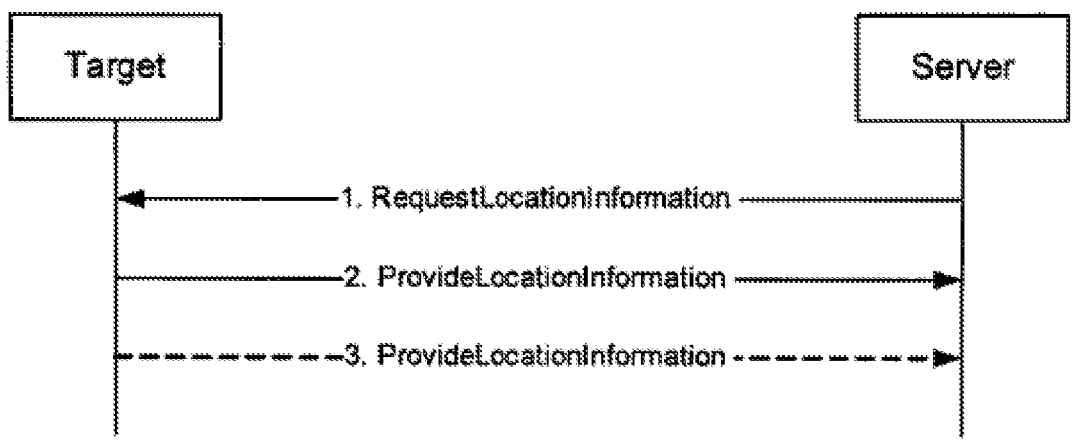
FIG. 4 is a signaling diagram for third party location assistance.

Some localization methods may benefit from assistance data, which can be provided by an LTE Positioning Protocol (LPP) server to the target device (e.g. UE). This can either be triggered by a request from the target device, as depicted in FIG. 2, or provided unsolicited from the LPP server, as depicted in FIG. 3. Moreover, the server can request the target device to provide location information, as depicted in FIG. 4. In general, the request/provide location information procedure is given by the following:

Upon receiving a RequestLocationInformation message, the target device shall:
if the requested information is compatible with the target device capabilities and configuration:
  include the requested information in a ProvideLocationInformation message;
  set the IE LPP-TransactionID in the response to the same value as the IE LPP-TransactionID in the received message; and
  deliver the ProvideLocationInformation message to lower layers for transmission.
otherwise:
if one or more positioning methods are included that the target device does not support:
  continue to process the message as if it contained only information for the supported positioning methods; and handle the signaling content of the unsupported positioning methods by LPP error detection.

Figure 5:
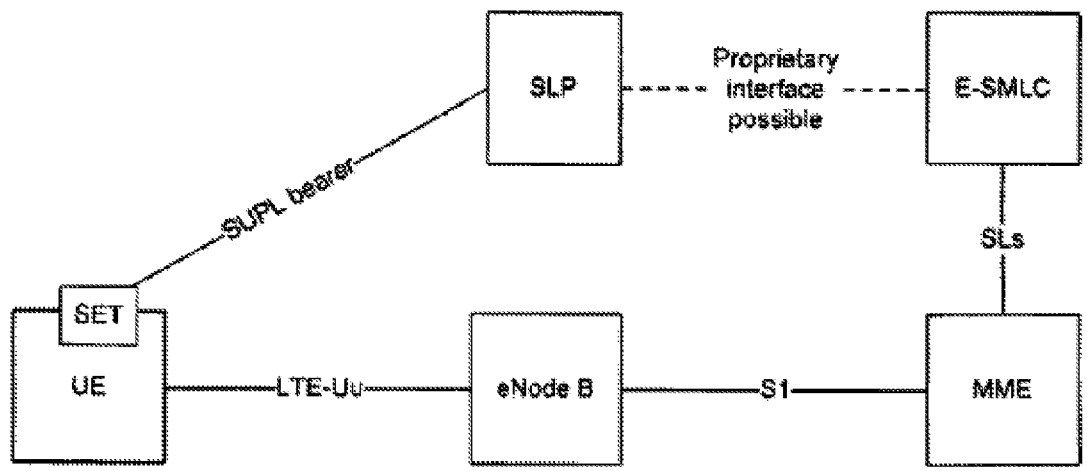
FIG. 5 is a block diagram of LTE localization servers.

The position (location) information can be reported together with the estimated errors (uncertainty) of the position and the velocity of the UE. The uncertainty of the position information depends on the method used, the position of the UE within the coverage area, and the activity of the UE. See 3GPP TS36.305, "Universal Terrestrial Radio Access (E-UTRA); Stage 2 functional specification of User Equipment (UE) positioning in E-UTRAN (Release 9)", Version 9.2.0, March 2010, the disclosure of which is incorporated herein by reference. The architecture of positioning in LTE is depicted in FIG. 5. See 3GPP TS 36.305, Stage 2 functional specification of User Equipment (UE) positioning in E-UTRAN, V9.4.0, the disclosure of which is incorporated herein by reference. The SLs interface, between the E-SMLC and the MME, and the S1-MME interface, between the eNode B and the MME, are transparent to all UE related and eNode B related positioning procedures. They are used only as a transport link for the LTE Positioning Protocols LPP and LPPa.

The initiator (MME) of the location service request procedure sends an LCS-AP Location Request message to the E-SMLC associated with the current serving cell for the target UE over SLs. See 3GPP TS 29.171, LCS Application Protocol (LCS-AP) between the Mobile Management Entity (MME) and Evolved Serving Mobile Location Centre (E-SMLC); SLs interface, V10.1.0, the disclosure of which is incorporated herein by reference.

Figure 6:
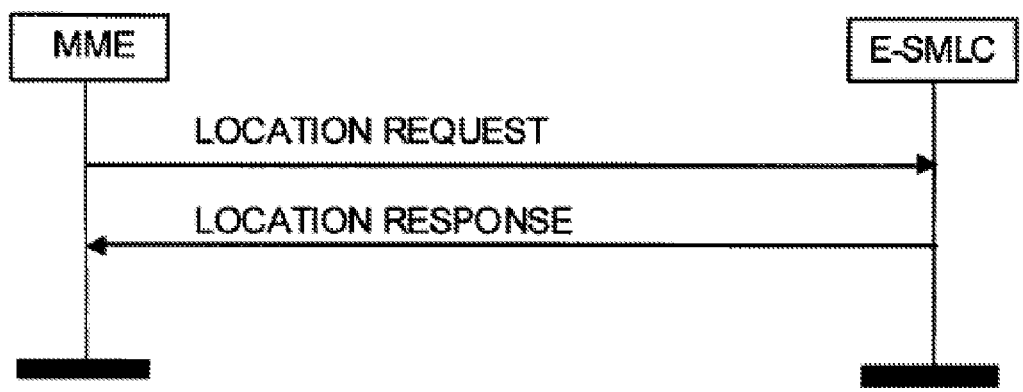
FIG. 6 is a signaling diagram for requested location assistance.

FIG. 6 depicts location request and response messages. The location request contains, among other information:
  The location QoS, consisting of horizontal accuracy, vertical accuracy and allowed response time (time until positioning is obtained);
  IMSI, IMEI; and
  Type of location estimate for the target UE in the case of a successful location attempt including estimation of location error.

The Location Response message contains, among other information:
  Positioning method used, e.g., OTDOA, GNSS or E-CID, as referred to above;
  Estimation of velocity; and
  Whether the returned position estimate satisfies the requested accuracy or not (accuracy fulfilment indicator).

Note that the Location Response message does not include the time at which the UE measurements were performed, for example when using OTDOA as positioning method.

Figure 7:
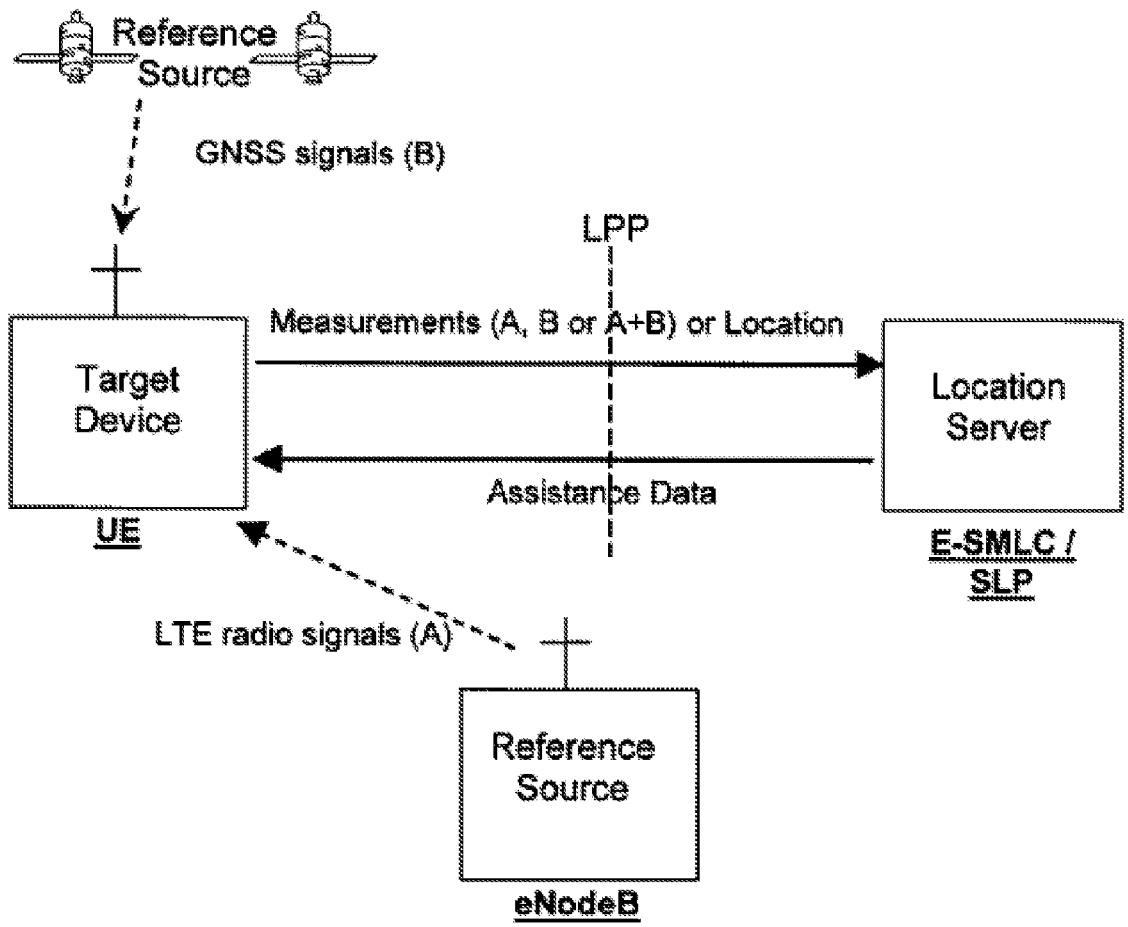
FIG. 7 is a block diagram of satellite location service.

The E-SMLC obtains positioning related information from eNodeB and UE using the LPP and LPPa protocols. See, 3GPP TS 36.355, Evolved Universal Terrestrial Radio Access (E-UTRA); LTE Positioning Protocol (LPP), V9.3.0 and 3GPP TS 36.455, Evolved Universal Terrestrial Radio Access (E-UTRA); LTE Positioning Protocol A (LPPa), V9.3.0, respectively, the disclosures of which are incorporated herein by reference. These are depicted in FIG. 7. The following information types are supported in LPP (the term "location information" applies both to an actual position estimate and to values used in computing position (e.g., radio measurements or positioning measurements):
  Request/Provide Capabilities;
  Request/Provide Assistance Data; data needed to enable UE or E-SMLC to compute position; and
  Request/Provide Location Information; to enable the E-SMLC to request position measurements from the UE, or to enable the UE to provide location measurements to the E-SMLC for position calculation.

In case of OTDOA positioning, the report from the UE (using LPP) contains among other information, also the system frame number (SFN) during which the last measurement was performed.

The LTE Positioning Protocol Annex (LPPa) carries information between the eNode B and the E-SMLC. It is used to support the following positioning functions:

E-CID cases where measurements are transferred from the eNode B to the E-SMLC; and Assistance data collection from eNodeBs for support of downlink OTDOA positioning.

The LPP and LPPa protocols are transparent to the MME.

Localization in conjunction with Minimization of Drive Tests (MDT) measurements in LTE/EPC will now be briefly described with reference to FIGS. 8 and 9. As the UE tags MDT measurement results with location information by default, if such information is available in the UE, it is the default way to associate location information with MDT measurements and it is applicable both in case of immediate and logged MDT measurements. The other option to associate location information with MDT data is to obtain UE location information via network based localization function, in which case the network based localization procedure needs to be triggered together with MDT measurements. The network based localization applies only for immediate MDT. The procedures for triggering network based localization together with MDT measurement activation are described below for E-UTRAN and EPC based activation. See S5UEPM0016, pCR to shadow TS 32.422 for MDT, "Coordination of network based localization with MDT", Ericsson, the disclosure of which is incorporated herein by reference.

Figure 8:
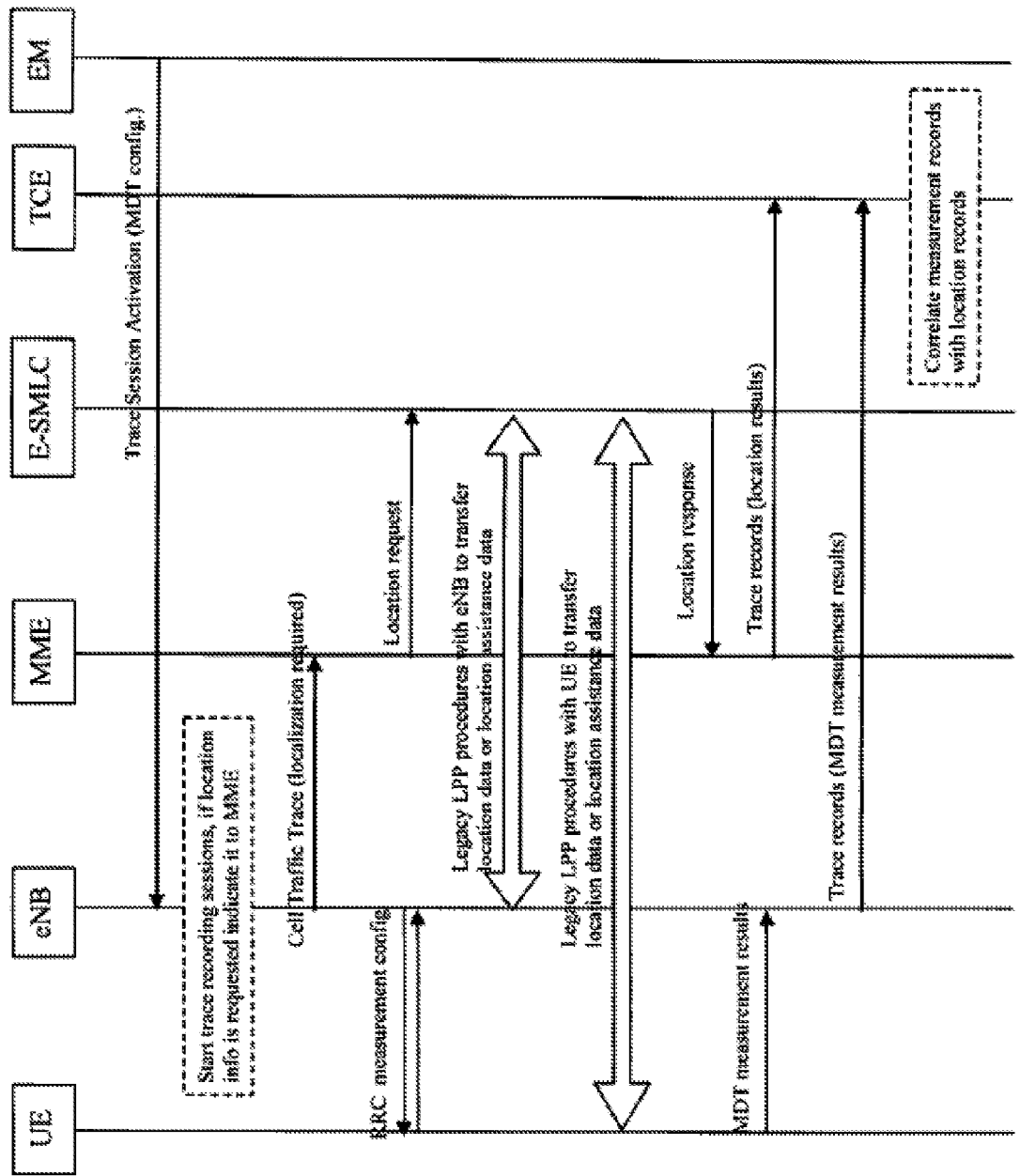
FIG. 8 is a network signaling diagram.

The signaling sequence of triggering network-based UE localization in connection with E-UTRAN-based activation of UE network performance measurements is illustrated in FIG. 8.

1. The procedure is started with the eNodeB receiving the Trace Session activation request from the Element Manager (EM), including the MDT configuration parameter. When eNodeB receives the Trace Session activation request from its EM, it shall start a Trace Session.

2. eNodeB shall start a Trace Recording Session for each UE satisfying the selection condition and shall configure the MDT measurements at the selected UEs.

3. eNodeB shall signal the activation of the Trace Recording Session to the MME in order for the MME to send the UE identities to the Trace Collection Entity (TCE) for the given UE. The UE identities may be International Mobile Subscriber Identity (IMSI) or International Mobile station Equipment Identity (and Software Version) (IMEI(SV)). If network based localization was requested in the MDT configuration received from the EM, the eNodeB shall indicate to the MME the request for triggering network based localization for the UE.

4. Upon receiving the Cell Traffic Trace message at the MME, the MME shall request localization from the E-SMLC for the given UE, if request for localization was indicated in the message. It shall be possible to request periodic reporting of UE location from E-SMLC.

5. The E-SMLC performs the legacy LPP protocol procedures with the eNodeB and/or with the UE, depending on the type of localization method employed and calculates the UE position, which is sent back to the MME.

6. The MME shall include the location report in a trace record identified by the Trace Session reference and Trace Recording Session reference of the particular UE and shall send the trace record with location data to the TCE.

7. The MDT measurement reports are collected from the UE by the eNodeB and are sent to the TCE. The MDT measurement results and location data can be correlated in the TCE based on the UE identity.

Figure 9:
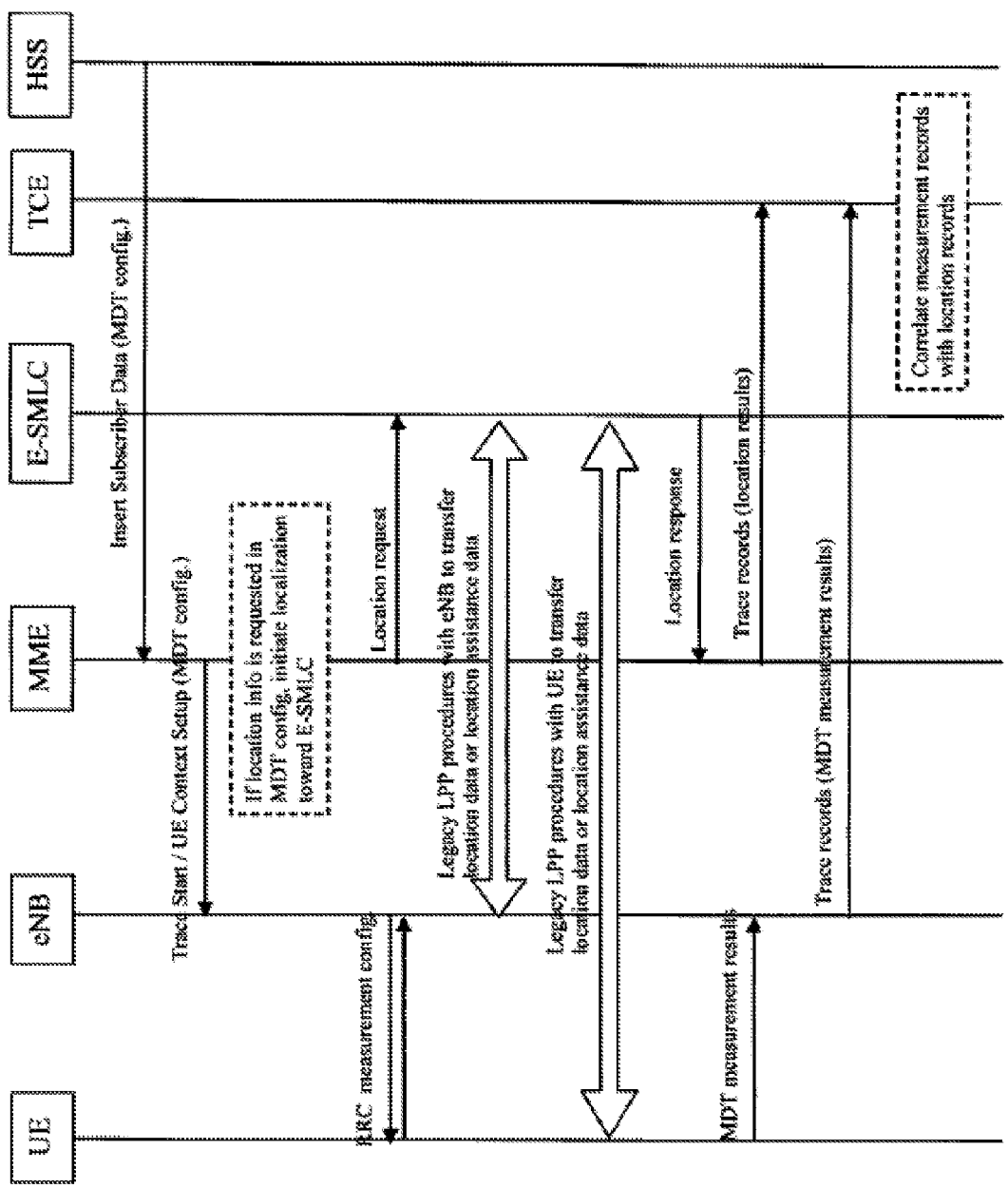
FIG. 9 is a network signaling diagram.

The signaling sequence of triggering network-based UE localization in connection with EPC-based activation of UE network performance measurements is illustrated in FIG. 9.

1. The procedure is started with the MME receiving the trace activation request from the Home Subscriber Server (HSS) for the particular UE.

2. The MME shall send trace activation for UE measurements toward the eNodeB. If network based localization is requested for the particular UE in the MDT configuration, the MME shall request localization for the UE from the E-SMLC. It shall be possible to request periodic reporting of UE location from E-SMLC.

3. The E-SMLC performs the legacy LPP protocol procedures with the eNodeB and/or with the UE, depending on the type of localization method employed and calculates the UE position, which is sent back to the MME.

4. The MME shall include the location report in a trace record identified by the Trace Session reference of the particular UE and shall send the trace record with location data to the TCE.

5. The MDT measurement reports are collected from the UE by the eNodeB and are sent to the TCE. The MDT measurement results and location data can be correlated in the TCE based on the UE identity.

Embodiments of the aspects as referred to in the summary section will now be described in detail with reference to FIGS. 10-26.

Figure 10:
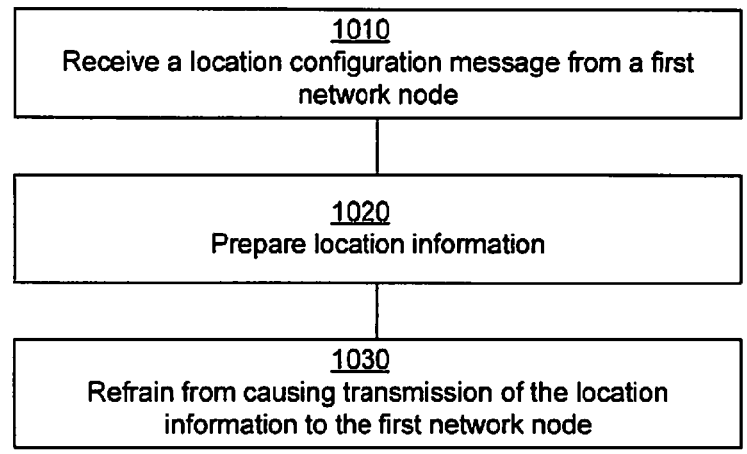
FIG. 10 is a flow diagram of a method according to a first aspect.

FIG. 10 illustrates the first aspect in the form of a method of generating location information in a terminal device operative in a wireless communication network. The wireless communication network may for instance be LTE/EPC (Evolved Packet Core)/E-UTRAN compliant, i.e. like the network 100 shown in FIG. 1. The terminal device may for instance be a UE, such as the UE 150 seen in FIG. 1. Possible representations of the terminal device are also seen at 200 in FIG. 21 and as 400 in FIG. 17 (both figures will be described in more detail later).

The method of FIG. 10 is performed by the terminal device 150, 200 and involves receiving 1010, 248 (FIG. 21) a location configuration message from a first network node. The first network node may for instance be an Evolved Serving Mobile Location Center (E-SMLC). Possible representations of the first network node are seen at 210 in FIG. 21 and as 500 in FIG. 18.

Figure 21:
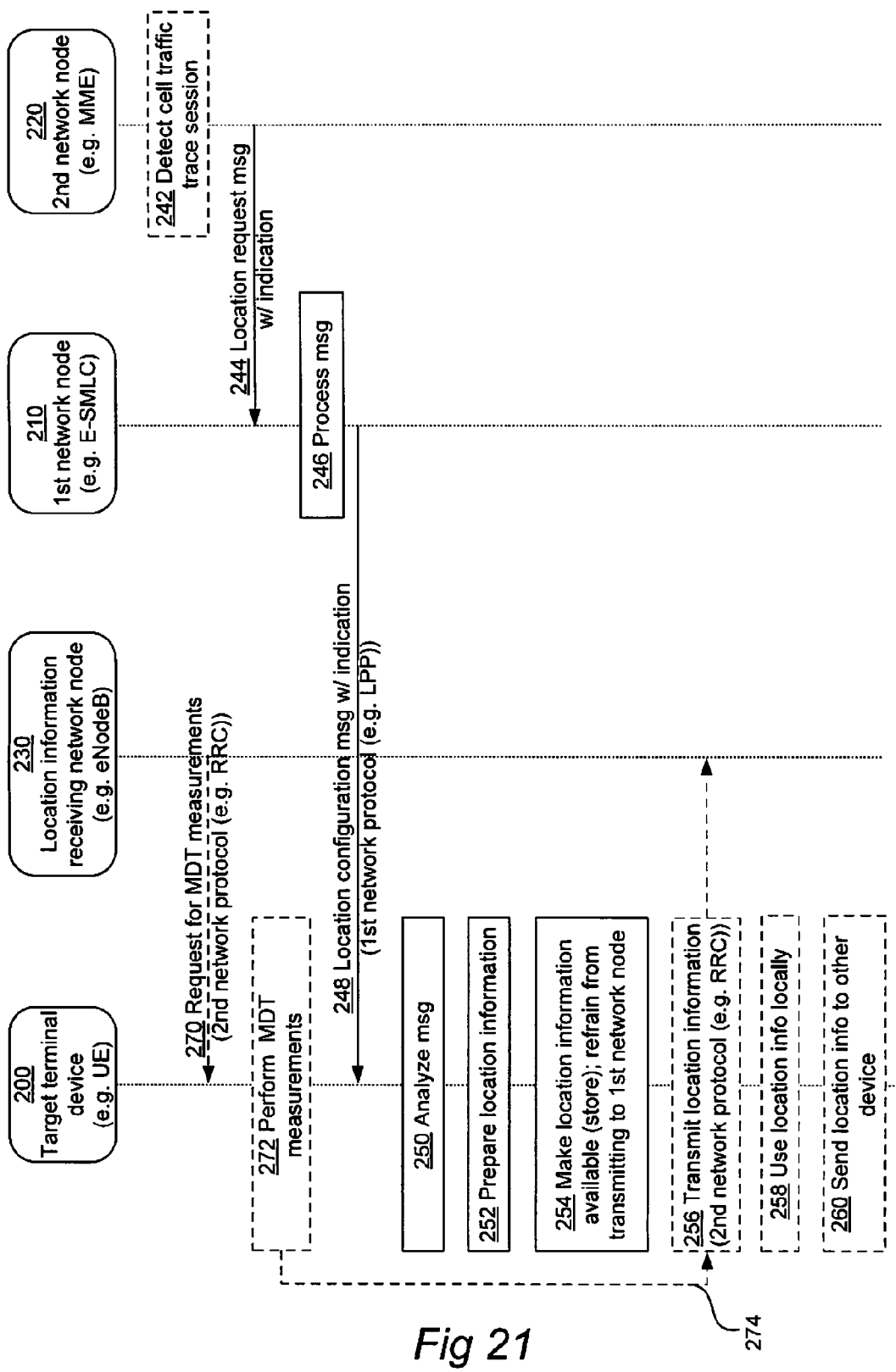
FIG. 21 is a combined flow and signaling diagram illustrating embodiments of the aspects referred to above and in the summary section.

In response, as seen at 1020 in FIG. 10 and 252 in FIG. 21, the terminal device 150, 200 prepares location information, and refrains 1030, 254 from causing transmission of the location information to the first network node 210. Hence, the prepared location information is not returned or sent back by the terminal device to the first network node. The prepared location information may for instance comprise GNSS localization data, OTDOA localization data, or E-CID localization data. The prepared location information may for instance comprise a location estimate (i.e. an actual estimation of the position of the terminal device), and/or location-related measurement values which can be used in computing the position of the terminal device.

Figure 11:
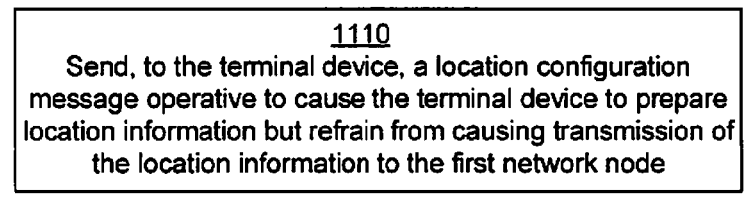
FIG. 11 is a flow diagram of a method according to a second aspect.

The first network node 210 may configure the terminal device 200 to prepare the location information but refrain from causing transmission of it back to the first network node by including in the location configuration message an indication that no location information is expected by the first network node 210 in return. The functionality pursuant to the second aspect referred to in the summary section—i.e. as seen from the first network node 210—is illustrated in FIG. 11, see 1110.

Accordingly, after having received the location configuration message at 248 in FIG. 21, the terminal device 200 may analyze 250 the received location configuration message to check for the presence of said indication. If the indication is included in the location configuration message, the terminal device 200 will accordingly refrain 254 from causing transmission of the location information (prepared at 252) to the first network node 210.

The indication may for instance be in the form of a message parameter of the location configuration message having a certain value being different from other possible values of the message parameter, or a message parameter of the location configuration message being included which is not normally included in the location configuration message.

Figure 13:
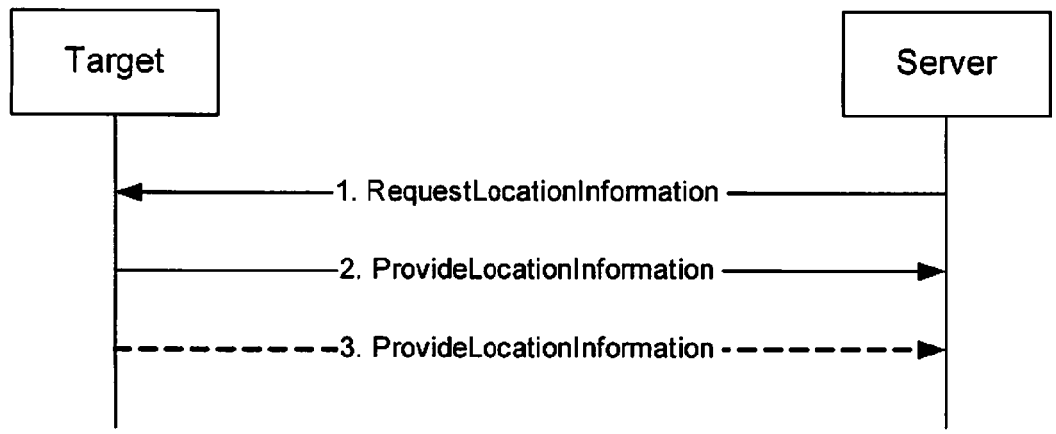
FIG. 13 is a signaling diagram for communication of a location configuration message from a first network node to a target terminal device.

The location configuration message may for instance be an LPP message, such as the RequestLocationInformation message shown in FIG. 13. The terminal device (UE) 200 may respond to the first network node (E-SMLC) 210 with a ProvideLocationInformation message that only acknowledge the receipt of the location configuration message and/or successful or failed obtaining of the location information, or even successful or failed redirection (delivery to another node) of the location result. This can be realized with a ProvideLocationInformation with endIndication equal to TRUE but no location information included.

The RequestLocationInformation includes the CommonIEsRequestLocationInformation IE, which can be modified to represent the aforementioned indication. For instance, the locationInformationType IE (which describes whether the UE is requested to provide a position estimate or position measurements, or a preference between the two) could be extended to also include values such as locationEstimatePrepared/locationEstimateMadeAvailable and locationMeasurementPrepared/locationMeasurementMadeAvailable, or similar to provide said indication that the location information should be prepared and made available in the terminal device (UE) 200 but not reported back via LPP to the first network node (E-SMLC) 210.

Alternatively, the QoS IE may include a response time IE which is not supposed to be included when requesting periodical reporting. One way to indicate that a response via LPP is not expected is to reserve one response time value, e.g. 128, to indicate that no location information response via LPP is expected.

Alternatively, the location configuration message may comprise an instruction to the terminal device 150, 200, wherein the instruction may be any of: no location information feedback, configuration only, location information preparation only, making location information available only, or redirect a location report. Such an instruction may for instance be communicated as a separate dedicated message parameter of the location configuration message. Hence, when the location configuration message is implemented as the RequestLocationInformation message shown in FIG. 13, a new indication IE like "no location information feedback", 'configuration only', "redirected location report", or similar, may be included in the RequestLocationInformation message. Alternatively, a new purpose IE like 'Minimization of Drive Test'. 'configuration only', "redirected report", or similar, may be included in the RequestLocationInformation message.

Optionally, the first network node (E-SMLC) 210 may provide the terminal device (UE) 200 with assistance data prior to the request for location information.

In another embodiment, the aforementioned indication is evaluated conditioned on whether the UE is configured for reporting via RRC or not. This addresses a UE that receives a location configuration message from LPP including an indication 'minimization of drive test' or similar. If the UE is configured with MDT reporting via RRC, and location information can be included, then the UE discontinues location information reporting via LPP. However, if no RRC measurement configuration is configured, then the UE provides location information via LPP.

Advantageously, instead of returning the prepared location information back to the first network node 210, the terminal device 200 may be configured to transmit the prepared location information to a location information receiving entity. As seen in FIG. 21, such a location information receiving entity may for instance be a location information receiving network node 230, such as an eNodeB or a serving eNodeB, which is different from the first network node 210. The transmission of the prepared location information to an eNodeB 230 is shown at 256 in FIG. 21.

Alternatively, such a location information receiving entity may be a location information receiving function within the terminal device 200. Such an internal function is indicated schematically at 150a for the terminal device 150 in FIG. 1 and may for instance be an application program making use of the prepared location information. The transmission of the prepared location information to an internal function within the terminal device 200 is shown at 258 in FIG. 21.

Alternatively, such a location information receiving entity may be a location information receiving device (such as the one indicated at 152 in FIG. 1), which is operative in the wireless communication network 100 and is different from the terminal device 150, 200. Hence, when the terminal device 150, 200 is a UE, the location information receiving device may be another UE 152 directly operative in the wireless communication network 100, or it may be a device like a machine, vehicle or sensor, in some sort of communication with the UE 150, 200, thereby possibly only being indirectly operative in the wireless communication network 100. The transmission of the prepared location information to a different device is shown at 260 in FIG. 21.

To this end, the terminal device 200 may analyze (indicated at 250 in FIG. 21) the received location configuration message to check for information allowing the terminal device 200 to identify the location information receiving entity 230, 150a, 152. If such information is found to be included in the location configuration message, the terminal device 200 will accordingly transmit the location information to the identified location information receiving entity, as explained above with reference to 256, 258 and 260, respectively, in FIG. 21.

Hence, the location information receiving entity may be directly specified in the location configuration message by way of, for instance, an identity of the location information receiving entity in the wireless communication network. Alternatively, the location information receiving entity may be indirectly specified in the location configuration message by way of, for instance, sufficient information for the terminal device to find an association with a predefined identity of the location information receiving entity.

Advantageously, when the location information receiving entity 230 is said location information receiving network node 230, the location configuration message is received 1010, 248 from the first network node 210 over a first network protocol, such as LPP, whereas the prepared location information is transmitted 256 to the location information receiving network node 230 over a second network protocol, such as RRC, different from said first network protocol.

Figure 12:
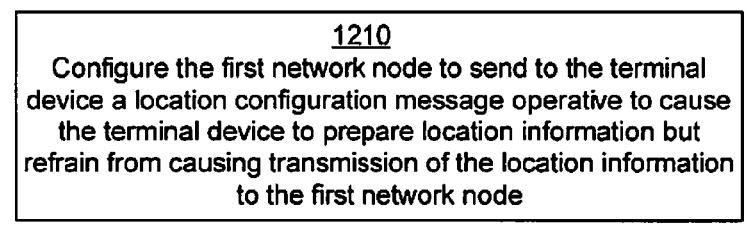
FIG. 12 is a flow diagram of a method according to a third aspect.

Pursuant to the third aspect referred to in the summary section, the first network node 210 may be configured via a second network node 220, wherein the second network node may for instance be an MME and the first network node an E-SMLC. Hence, as seen in FIGS. 12 and 21, according to a method, by the second network node 220 in the wireless communication network 100, of generating location information in the terminal device 150, 200, the second network node 220 may configure 1210 the first network node 210 to send 248 to the terminal device a location configuration message operative to cause the terminal device to prepare 252 location information but refrain 254 from causing transmission of the location information to the first network node.

The second network node 220 may perform this configuration by sending 244 to the first network node 210 a location request message comprising an indication that the terminal device 200 shall be instructed to prepare 252 location information in the terminal device but refrain 254 from causing transmission of the location information to the first network node 210. The configuration may also include that the terminal device 200 is instructed not to send the prepared location information back to the second network node 220 either.

Thus, as seen in FIG. 21, the sending 244 by the second network node 220 of the location request message to the first network node 210 is intended to trigger the first network node 210 to send 1110, 248 the location configuration message to the terminal device 200.

The location request message may also be configured to cause the terminal device 200 to transmit the prepared location information to a location information receiving entity, as has already been described above.

Figure 14:
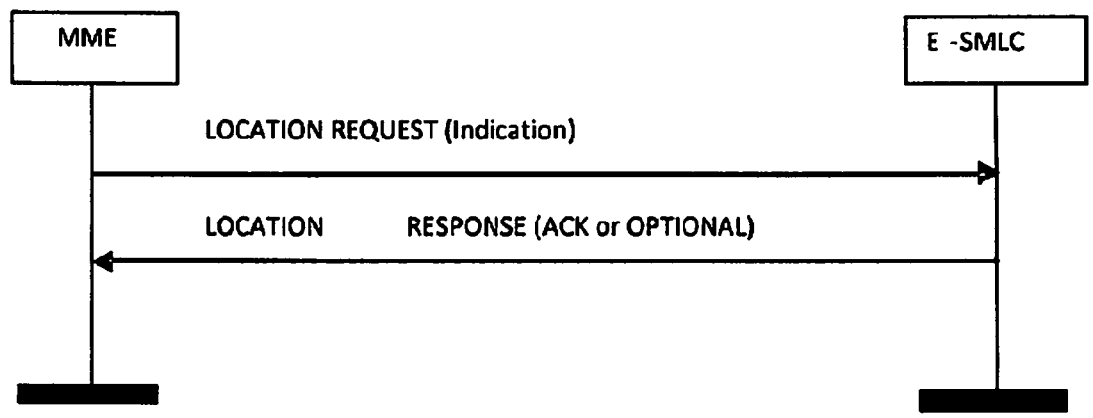
FIG. 14 is a signaling diagram for communication of a location request message from a second network node to a first network node.

As seen in FIG. 14, the location request message may be implemented as a Location Request message from MME to E-SMLC. The Location Request message will contain location configuration information and the aforementioned indication that no location information is expected in return, i.e. that the UE shall be instructed to prepare and make the location information available but refrain from causing transmission of the prepared location information to the E-SMLC, as already explained above.

This indication can be encoded in different ways:
The Location Type IE can currently be geographical information, assistance information, or the like, and a new field can be added to indicate 'configuration only', or similar.
The Client Type IE defines the type of the originating LCS (Location Services) Client. It shall be included if the Location Type indicates a request for a location estimate and may be included in other cases to assist an SMLC to appropriately prioritize a location request. In one embodiment, the value 'Minimization of Drive Test Configuration' or similar could be added to indicate that no location information is expected in return.
The LCS QoS IE contains a response time IE, which could include a new value 'never' or 'no response expected', or similar.
The location request Message Type is separated into a Procedure Code (O represents Location Request), and Type of Message (initiating message, successful outcome, unsuccessful outcome, etc.). A new Type of Message alternative could be added.
A new indication IE 'no location information feedback', 'configuration only', "redirected location report", or similar
A new purpose IE 'Minimization of Drive Test'. 'configuration only', "redirected report", or similar.

In an alternative embodiment, the second network node may be adapted to configure the first network node to cause the terminal device to prepare location information as described above for the main embodiments. The second network node in this alternative embodiment may further be adapted to configure the first network node to refrain from sending the prepared location information back to the second network node. Thus, in this alternative embodiment, the terminal device may return the prepared location information to the first network node, but the first network node will be configured not to forward it to the second network node.

Figure 15:
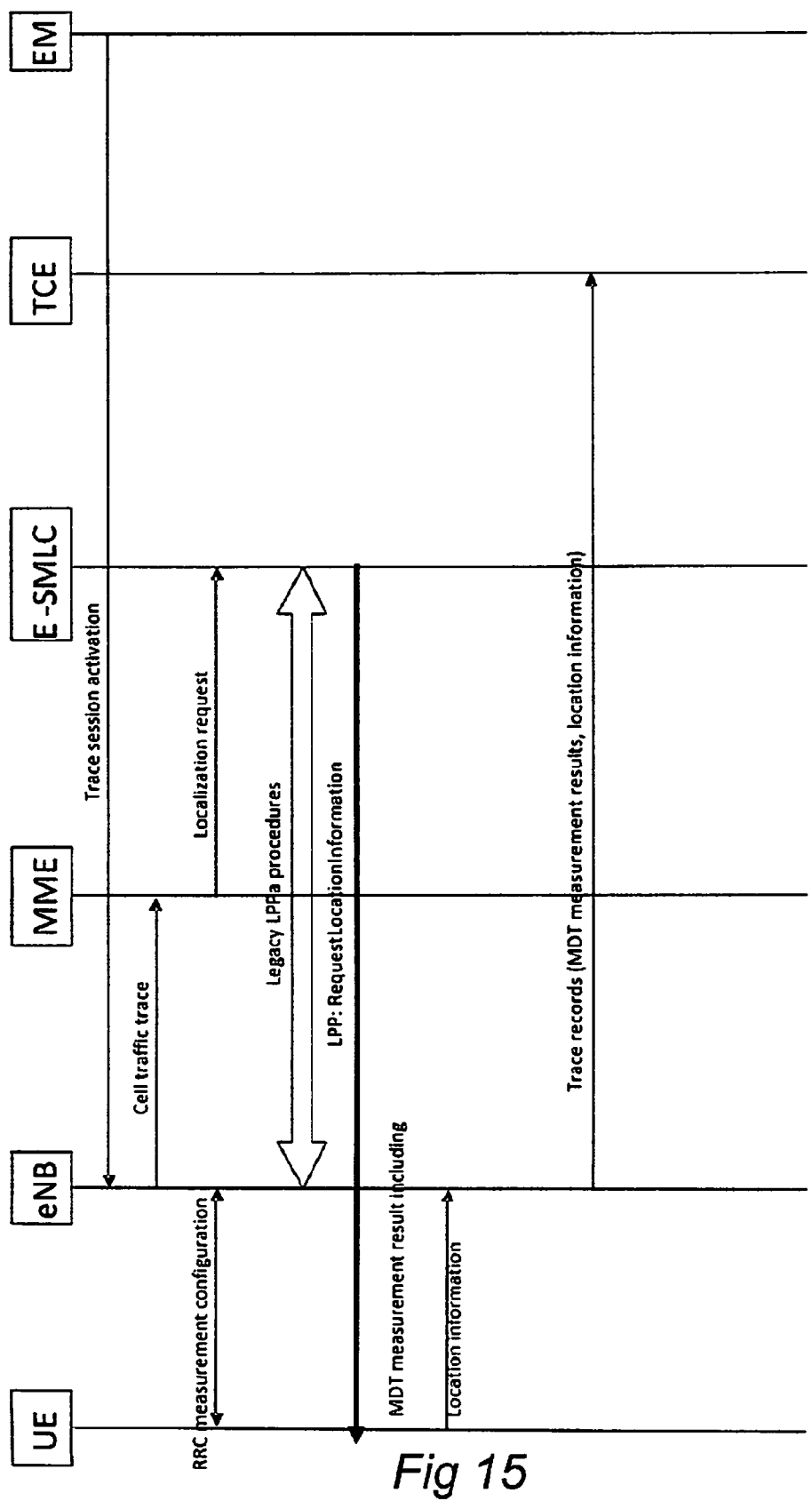
FIG. 15 is a network signaling diagram.
Figure 16:
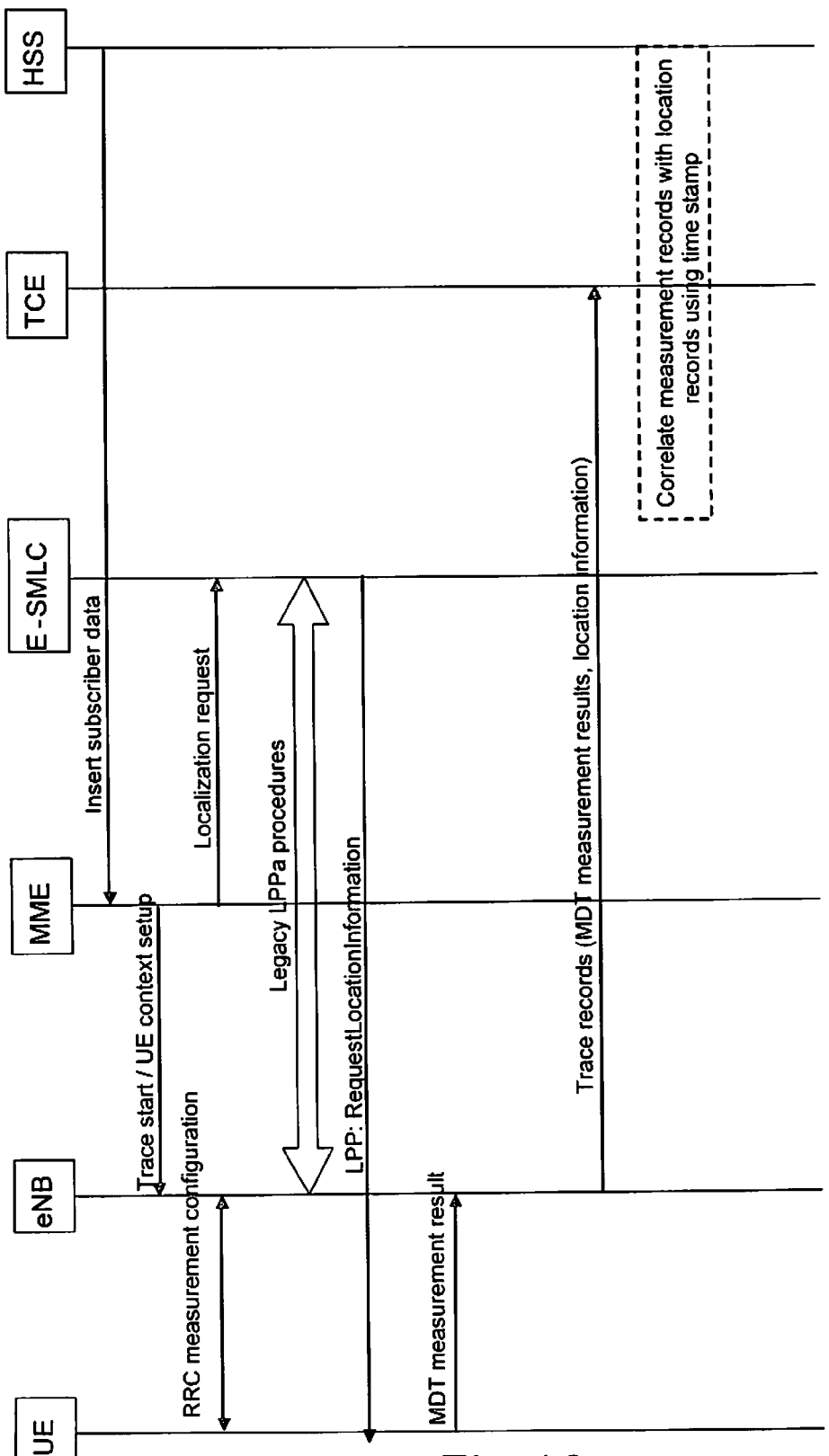
FIG. 16 is a network signaling diagram.

FIG. 21 gives an overview of the novel functionalities described above in a MDT reporting context. FIGS. 15 and 16 give further details. FIG. 21 illustrates a simplified signaling sequence of triggering network-based UE localization in connection with E-UTRAN-based, activation of MDT measurements. In the situation shown in FIG. 21, an EM (not shown in this Figure but described with respect to FIG. 8 above and FIG. 15 below) has generated a Trace Session activation request which has been received by the eNodeB 230. In response, the eNodeB 230 places a request 270 over RRC with the UE (i.e. the target terminal device) 200 to perform MDT measurements 272. The eNodeB thus starts a Trace Recording Session for the UE 200 (and other relevant UEs) and also signals the activation of the Trace Recording Session to the MME (i.e. the second network node) 220. The MME 220 detects this in step 242, generates the location request message and sends it to the E-SMLC (i.e. the first network node) 210 in step 244.

Upon receipt of the location request message, the E-SMLC 210 process the message at 246, discovers the indication included therein that no location information is expected in return, accordingly generates the location configuration message, and sends it at 248 over LPP to the UE 200.

Upon receipt of the location configuration message from the E-SMLC 210, the UE 200 analyzes 250 the contents to identify the indication that that no location information is expected in return, and prepares the location information at 252. Upon having found in step 250 that no location information is expected in return, the UE 200 makes the prepared location information available in the UE 200 at 254 while refraining from causing transmission of it back to the E-SMLC 210 (nor back to the MME 220). Instead, if applicable and as configured by the location request message and location configuration message, the UE 200 transmits the prepared location information at 256 to the specified location information receiving network node, here in the form of the eNode 230, over RRC. Advantageously, this is done together with the results of the MDT measurements from step 272, as seen at 274. Alternatively, the UE 200 may transmit the prepared location information at 258 to a local function within the terminal device, or to another device in the network, as seen at 260.

FIG. 15 and FIG. 16 illustrate possible extensions to E-UTRAN- and EPC-based UE measurement activation and reporting via RRC in order to handle the novel functionalities described above in a full MDT reporting context.

Note, that in FIG. 15 and FIG. 16, the LCS client is internal in the MME, i.e., the MME requests location information. The solutions described below can be generalized to the cases where:

- The LCS client is internal in the UE, i.e., the UE requests for location information;
- The LCS client is external to the MME. In this case the LCS is always connected to MME via an entity denoted GMLC;
- The LCS client is internal in the eNodeB, i.e., the eNodeB requests for location information. This scenario is not specified in the 3GPP standards.

Figure 17:
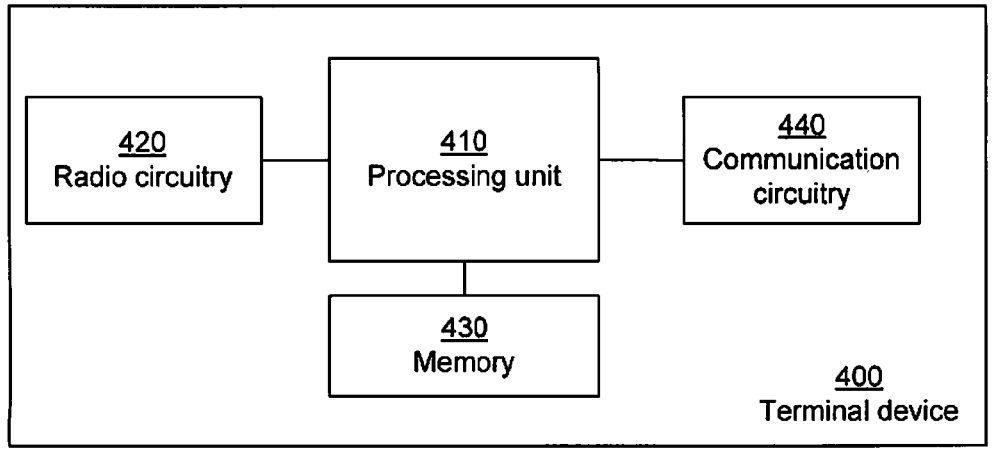
FIG. 17 is a block diagram of a terminal device.

A terminal device 400 capable of implementing the first aspect according to FIG. 10 as described herein, including its additional features, is shown in FIG. 17. The terminal device may be a mobile terminal in the ordinary sense (such as, for instance, a UE or a mobile station (MS)), or a terminal device associated with another device, such as a vehicle, machine or sensor, and not primarily designed for interaction with a human user. Hence, in the latter case, the terminal device may alternatively be, for instance, a Machine Device (MD) enabled for Machine Type Communication (MTC) in LTE or Machine To Machine (M2M) communication in UMTS.

The terminal device 400 comprises radio circuitry 420 for communication with the wireless communication network 100, a memory 430 and a processing unit 410. The radio circuitry 420 is configured to receive a location configuration message from the first network node 210 in the wireless communication network. The processing unit 410 is configured to prepare location information but refrain from causing transmission of the location information in return to the first network node. Hence, the terminal device 400 is configured to carry out the functionality 1010-1030 explained above with reference to FIG. 10, as well as any of its additional features described above and shown in for instance steps 250-260 of FIG. 21.

The prepared location information can be transferred from the terminal device 400 to the location information receiving entity either via the radio circuitry, or via communication circuitry 440. Transfers via the radio circuitry may involve a base station such as a serving base station, but also other third devices within range for radio communication. Transfers via the communication circuitry may include internal transfers within the device, but also other third devices connected to the terminal device 400. Examples of such third devices include vehicles, machines, sensors, and the like.

Figure 18:
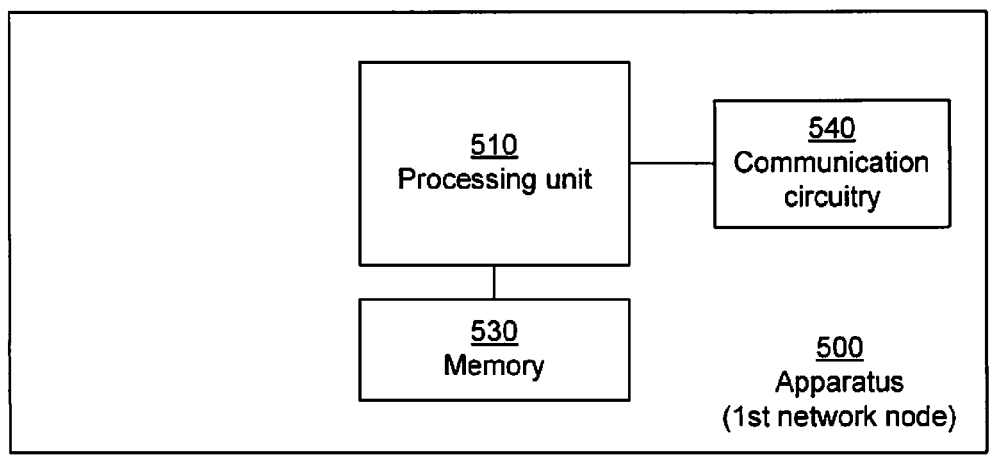
FIG. 18 is a block diagram of a first network node.

An apparatus 500 capable of implementing the second aspect according to FIG. 11 as described herein, including its additional features, is shown in FIG. 18. The apparatus 500 is intended for use as the first network node 210 in the wireless communication network 100 and comprises communication circuitry 540 for communication with a terminal device 150, 200, such as the terminal device 400 referred to above, via the wireless communication network. The apparatus 500 also comprises a memory 530 and a processing unit 510. The communication circuitry 540 is configured to send to the terminal device a location configuration message operative to cause the terminal device to prepare location information but refrain from causing transmission of the location information to the first network node 210. Hence, the apparatus 500 is configured to carry out the functionality 1110 performed by the first network node 210 according to FIG. 11, as well as any of its additional features described above and shown in for instance steps 244, 246, 248 of FIG. 21.

Figure 19:
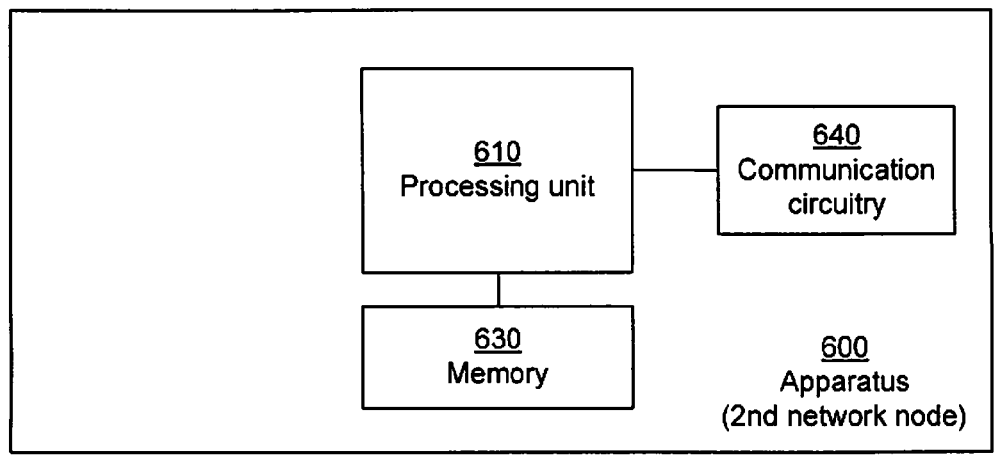
FIG. 19 is a block diagram of a second network node.

An apparatus 600 capable of implementing the third aspect according to FIG. 12 as described herein, including its additional features, is shown in FIG. 19. The apparatus 600 is intended for use as the second network node 220 in the wireless communication network 100 and comprises communication circuitry 640 for communication with a first network node 210, such as the apparatus 500 referred to above, in the wireless communication network 100. The apparatus 600 also comprises a memory 630 and a processing unit 610. The communication circuitry is configured to send a location request message to the first network node, wherein the location request message is operative to cause the first network node to send to the terminal device a location configuration message operative to cause the terminal device to prepare location information but refrain from causing transmission of the location information to the first network node 210. Hence, the apparatus 600 is configured to carry out the functionality 1210 performed by the second network node 220 according to FIG. 12, as well as any of its additional features described above and shown in for instance steps 242, 244 of FIG. 21.

Figure 20:
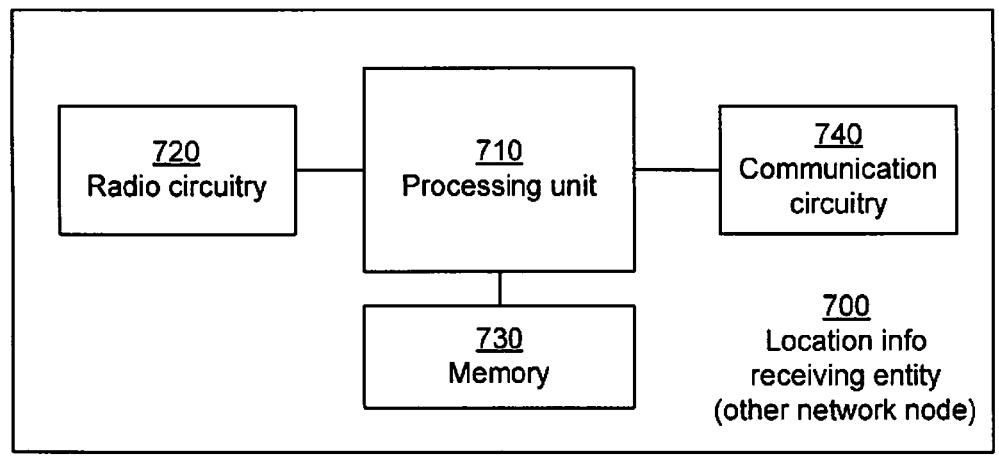
FIG. 20 is a block diagram of a location information receiving network node.

An apparatus 700 capable of implementing a location information receiving entity in the form of a location information receiving network node 230 is shown in FIG. 20. The apparatus 700 may comprise communication circuitry 740 for communication with other network nodes in the wireless communication network 100. The apparatus 700 may also comprises radio circuitry 720 for communication with terminal devices in the wireless communication network 100, including the terminal device 200, over an air interface. Further, the apparatus 700 may comprises a memory 730 and a processing unit 710. The apparatus 700 is therefore capable of receiving the prepared location information from the terminal device 200 and may make appropriate use of it by storing it in the memory 730, supplying it as input data to an application program or other functionality provided by the processing unit 710, and/or communicating all or part of the information further to other entities via the wireless communication network 100.

In all embodiments, the processing unit or processor may comprise any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored-program, general-purpose processors, such as a microprocessor or Digital Signal Processor (DSP), together with appropriate software; or any combination of the above.

In all embodiments, the memory may comprise any non-transient machine-readable media known in the art or that may be developed, including but not limited to magnetic media (e.g., floppy disc, hard disc drive, etc.), optical media (e.g., CD-ROM, DVD-ROM, etc.), solid state media (e.g., SRAM, DRAM, DDRAM, ROM, PROM, EPROM, Flash memory, etc.), or the like.

In all embodiments, the radio circuitry may comprise a transceiver used to communicate with one or more other transceivers over a Radio Access Network according to one or more communication protocols known in the art or that, may be developed, such as IEEE 802.xx, CDMA, WCDMA, GSM, LTE, WiMax, or the like. The transceiver implements transmitter and receiver functionality appropriate to the Radio Access Network links (e.g., frequency allocations and the like). The transmitter and receiver functions may share circuit components and/or software, or alternatively may be implemented separately.

In all embodiments, the communication circuitry may comprise a receiver and transmitter interface used to communicate with one or more other nodes over a communication network according to one or more communication protocols known in the art or that may be developed, such as Ethernet, TCP/IP, SONET, ATM, or the like. The communication circuitry implements receiver and transmitter functionality appropriate to the communication network links (e.g., optical, electrical, and the like). The transmitter and receiver functions may share circuit components and/or software, or alternatively may be implemented separately.

Figure 22:
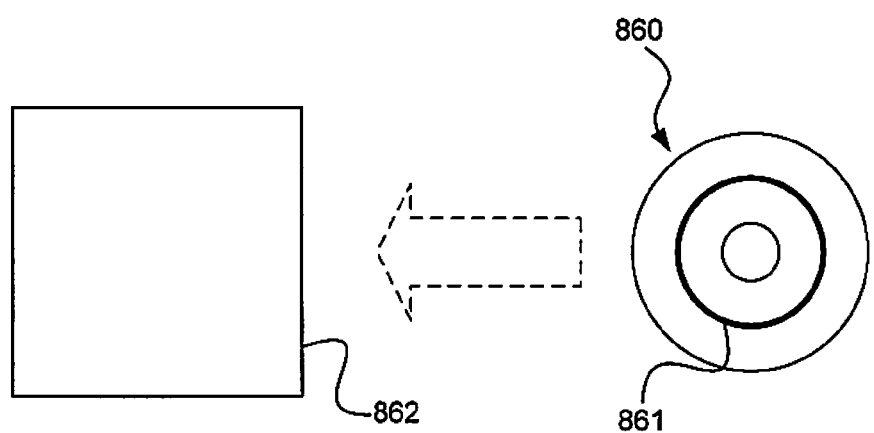
FIG. 22 is a block diagram of a computer readable medium.

FIG. 22 shows a schematic view of a computer-readable storage medium 860. The computer-readable storage medium 860 may be a stand-alone device such as a CD (Compact Disc), DVD (Digital Video Disc), memory stick, flash drive, portable hard drive, etc. Alternatively, the computer-readable storage medium 860 may be an internal memory in an existing apparatus or device, such as for instance the memory 430 in the terminal device 400 of FIG. 17, the memory 530 in the first network node 500 of FIG. 18, or the memory 630 in the second network node 600 of FIG. 19. The computer-readable storage medium 860 is encoded with instructions 861 that, when loaded into and executed by a processor, cause performance of any of the methods described above with reference to the first, second and third aspects.

Hence, in one embodiment, the computer-readable storage medium 860 is encoded with instructions 861 that, when loaded into and executed by a processor, cause performance of the functionality 1010-1030 performed by the terminal device 150/200 according to FIG. 10, as well as any of its additional features described above and shown in for instance steps 250-260 of FIG. 21. The processor may, for instance, be the processing unit 410 of the terminal device 400 shown in FIG. 17.

In another embodiment, the computer-readable storage medium 860 is encoded with instructions 861 that, when loaded into and executed by a processor, cause performance of the functionality 1110 performed by the first network node 210 according to FIG. 11, as well as any of its additional features described above and shown in for instance steps 244, 246, 248 of FIG. 21. The processor may, for instance, be the processing unit 510 of the apparatus 500 shown in FIG. 18.

In yet another embodiment, the computer-readable storage medium 860 is encoded with instructions 861 that, when loaded into and executed by a processor, cause performance of the functionality 1210 performed by the second network node 220 according to FIG. 12, as well as any of its additional features described above and shown in for instance steps 242, 244 of FIG. 21. The processor may, for instance, be the processing unit 610 of the apparatus 600 shown in FIG. 19.

The computer-readable storage medium 860 may be arranged to be read by a reading device 862 for loading the instructions into the processor.

Advantages of embodiments described herein include that the very flexible and existing LPP protocol can be used to configure location information preparation in the target terminal device, so that such information is made available for example periodically. The very efficient reporting protocol RRC can be used to convey the location information to the eNodeB and further on to a node where data can be post-processed, aggregated and fused.

A further advantage is that the location information and the target device measurement will be time aligned in the log directly, so time alignment in the post processing can be avoided.

Other embodiments than those specifically set forth herein are possible without departing from essential characteristics of the aspects referred to above and in the summary section. The disclosed embodiments are to be considered in all respects as illustrative and not restrictive, and all changes coming within the meaning and equivalency range of the appended claims are intended to be embraced therein.

The invention claimed is:

1. A method of generating location information in a terminal device operative in a wireless communication network, comprising:
   receiving, at the terminal device, from a first network node, a location configuration message, wherein the first network node is configured by a second network node to send the location configuration message to the terminal device;
   in response to receiving the location configuration message, preparing location information;
   determining whether the location configuration message indicates that no location information is expected by the first network node in return; and
   in response to determining that the location configuration message indicates that no location information is expected by the first network node in return, refraining from causing transmission of the location information to the first network node and instead transmitting, by the terminal device, to a third network node that is different from the first network node, the location information.

2. The method of claim 1, wherein the third network node is one of:
   a location information receiving network node, and
   a location information receiving device different from the terminal device and operative in the wireless communication network.

3. The method of claim 1, further comprising:
   analyzing the received location configuration message to check for an indication that no location information is expected by the first network node in return; and
   refraining from causing transmission of the location information to the first network node in response to the indication.

4. The method of claim 1, wherein the location configuration message comprises an instruction to the terminal device, the instruction selected from the group consisting of:
   no location information feedback,
   configuration only,
   location information preparation only,
   making location information available only, and
   redirect a location report.

5. The method of claim 2, further comprising:
   analyzing the received location configuration message to check for information allowing the terminal device to identify the location information receiving entity; and
   transmitting the location information to the identified location information receiving entity in response to the information.

6. The method of to claim 2, wherein the location configuration message is received over a first network protocol and the location information is transmitted to the location information receiving network node over a second network protocol, different from the first network protocol.

7. The method according to claim 6, wherein the first network protocol is LTE Positioning Protocol (LPP) and wherein the second network protocol is LTE Radio Resource Control (RRC).

8. The method according to claim 6, further comprising:
receiving a request for Minimization of Drive Tests (MDT) measurements from the wireless communication network over the second network protocol;
performing at least one MDT measurement in the terminal device; and
transmitting results of the at least one MDT measurement with the location information to the location information receiving network node over the second network protocol.

9. A method, by a second network node in a wireless communication network, of generating location information in a terminal device operative in the wireless communication network, comprising:
configuring a first network node to send to the terminal device a location configuration message operative to cause the terminal device to:
prepare location information responsive to receiving the location configuration message;
determine whether the location configuration message indicates that no location information is expected by the first network node in return; and
in response to determining that the location configuration message indicates that no location information is expected by the first network node in return, refrain from transmitting the location information to the first network node and instead transmit, to a third network node that is different from the first network node, the location information.

10. The method of claim 9 wherein configuring a first network node comprises sending to the first network node a location request message comprising an indication that the terminal device be instructed to prepare location information in the terminal device but refrain from transmitting the location information to the first network node.

11. The method of claim 9 wherein the third network node is one of:
a location information receiving network node; and
a location information receiving device, different from the terminal device, that is operative in the wireless communication network.

12. The method of claim 9 further comprising:
detecting the initiation of a cell traffic trace session involving the terminal device; and
wherein configuring the first network node to send the location configuration message to the terminal device is in response to detecting the cell traffic trace session.

13. A method, by a first network node in a wireless communication network, of generating location information in a terminal device operative in the wireless communication network, comprising:
sending to the terminal device a location configuration message operative to cause the terminal device to:
prepare location information responsive to receiving the location configuration message;
determine whether the location configuration message indicates that no location information is expected by the first network node in return; and
in response to determining that the location configuration message indicates that no location information is expected by the first network node in return, refrain from transmitting the location information to the first network node and instead transmit, to a third network node that is different from the first network node, the location information; and
wherein the first network node is configured by a second network node to send the location configuration message to the terminal device.

14. The method of claim 13 further comprising:
receiving from a second network node a location request message comprising an indication that the terminal device be instructed to prepare location information in the terminal device but refrain from transmitting the location information to the first network node; and
wherein sending the location configuration message to the terminal device is in response to receiving the location request message.

15. The method of claim 13 wherein the third network node is one of:
a location information receiving network node; and
a location information receiving device, different from the terminal device, that is operative in the wireless communication network.

16. The method of claim 15, wherein the location configuration message comprises information allowing the terminal device to identify the location information receiving entity.

17. The method of claim 13 wherein the location configuration message includes an indication that no location information is expected by the first network node in return.

18. The method of claim 13 wherein the location configuration message comprises an instruction to the terminal device selected from the group consisting of:
no location information feedback,
configuration only,
location information preparation only,
making location information available only, and
redirect a location report.

19. A terminal device operative in a wireless communication network, comprising:
radio circuitry operative to communicate with wireless communication network nodes, and configured to receive a location configuration message from a first network node, wherein the first network node is configured by a second network node to send the location configuration message to the terminal device;
memory; and
a processing unit operably coupled to the radio circuitry and the memory, wherein the processing unit and the memory are configured to:
in response to receiving the location configuration message, prepare location information;
determine whether the location configuration message indicates that no location information is expected by the first network node in return; and
in response to determining that the location configuration message indicates that no location information is expected by the first network node in return, refrain from causing transmission of the location information to the first network node and instead transmit, to a third network node that is different from the first network node, the location information.

20. The terminal device of claim 19 wherein the third network node is one of:
a location information receiving network node; and
a location information receiving device, different from the terminal device, that is operative in the wireless communication network.

21. The terminal device of claims 19 wherein the processing unit is configured to:

analyze the received location configuration message to check for an indication that no location information is expected by the first network node in return, and refrain from causing transmission of the location information to the first network node in response to the indication.

22. The terminal device of claim 19 wherein the processing unit is configured to identify in the location configuration message an instruction to the terminal device, the instruction selected from the group consisting of:
no location information feedback,
configuration only,
location information preparation only,
making location information available only, and
redirect a location report.

23. The terminal device of claim 20, wherein the processing unit is configured to:
analyze the received location configuration message to check for information allowing the terminal device to identify the location information receiving entity, and
transmit the location information to the identified location information receiving entity in response to the information.

24. The terminal device of claim 20 wherein the radio circuitry is configured to:
receive the location configuration message over a first network protocol, and
transmit the location information to the location information receiving network node over a second network protocol different from the first network protocol.

25. The terminal device of claim 24 wherein the first network protocol is a LTE Positioning Protocol (LPP).

26. The terminal device of claim 24 wherein the processing unit is configured to:
receive a request for Minimization of Drive Tests (MDT) measurements from the wireless communication network over the second network protocol;
perform at least one MDT measurement in the terminal device; and
transmit results of the at least one MDT measurement with the location information to the location information receiving network node over the second network protocol.

27. The terminal device of claim 19 wherein the terminal device is a user equipment (UE).

28. An apparatus operative as a first network node in a wireless communication network, comprising:
communication circuitry operative to communicate with a terminal device via the wireless communication network, and;
memory; and
a processing unit operationally coupled to the communication circuitry and the memory, wherein the processing unit and the memory are configured to cause the communication circuitry to send to the terminal device a location configuration message operative to cause the terminal device to:
prepare location information responsive to receiving the location configuration message;
determine whether the location configuration message indicates that no location information is expected by the first network node in return; and
in response to determining that the location configuration message indicates that no location information is expected by the first network node in return, refrain from transmitting the location information to the first network node and instead transmit, to a third network node that is different from the first network node, the location information; and wherein the first network node is configured by a second network node to send the location configuration message to the terminal device.

29. The apparatus of claim 28 wherein:
the communication circuitry is configured to receive a location request message from a second network node, the location request message comprising an indication that the terminal device be instructed to prepare location information but refrain from transmitting the location information to the first network node, and
the processing unit is configured to cause the communication circuitry to send the location configuration message to the terminal device in response to receiving the location request message.

30. The apparatus of claim 28 wherein the third network node is one of:
a location information receiving network node, and
a location information receiving device, different from the terminal device, that is operative in the wireless communication network.

31. The apparatus of claim 28 wherein the apparatus is an Evolved Serving Mobile Location Center (E-SMLC).

32. An apparatus operative as a second network node in a wireless communication network, comprising:
communication circuitry operative to communicate with a first network node in the wireless communication network;
memory; and
a processing unit operationally coupled to the communication circuitry and the memory, wherein the processing unit and the memory are configured to cause the communication circuitry to send a location request message to the first network node, the location request message being operative to cause the first network node to send to the terminal device a location configuration message operative to cause the terminal device to:
prepare location information responsive to receiving the location configuration message;
determine whether the location configuration message indicates that no location information is expected by the first network node in return; and
in response to determining that the location configuration message indicates that no location information is expected by the first network node in return, refrain from transmitting the location information to the first network node and instead transmit, to a third network node that is different from the first network node, the location information.

33. The apparatus of claim 32 wherein the processing unit is configured to:
detect initiation of a cell traffic trace session involving the terminal device, and
cause the communication circuitry to send the location request message to the first network node in response to detecting the cell traffic trace session.

34. The apparatus of claim 32 wherein the apparatus is a Mobility Management Entity (MME).

35. A non-transient, computer-readable storage medium encoded with instructions that, when loaded and executed by a processor in a terminal device operative in a wireless communication network, cause the processor to:
receive from a first network node a location configuration message, wherein the first network node is configured by a second network node to send the location configuration message to the terminal device;

in response to receiving the location configuration message, prepare location information;

determine whether the location configuration message indicates that no location information is expected by the first network node in return; and in response to determining that the location configuration message indicates that no location information is expected by the first network node in return, refrain from transmitting the location information to the first network node and instead transmit, to a third network node that is different from the first network node, the location information.

36. A non-transient, computer-readable storage medium encoded with instructions that, when loaded and executed by a processor in a second network node in a wireless communication network, cause the processor to generate location information in a terminal device operative in the wireless communication network, by:

configuring a first network node to send to the terminal device a location configuration message operative to cause the terminal device to:

prepare location information responsive to receiving the location configuration message;

determine whether the location configuration message indicates that no location information is expected by the first network node in return; and in response to determining that the location configuration message indicates that no location information is expected by the first network node in return, refrain from transmitting the location information to the first network node and instead transmit, to a third network node that is different from the first network node, the location information.

37. A non-transient, computer-readable storage medium encoded with instructions that, when loaded and executed by a processor in a first network node in a wireless communication network, cause the processor to generate location information in a terminal device operative in the wireless communication network, by:

sending to the terminal device a location configuration message operative to cause the terminal device to:

prepare location information responsive to receiving the location configuration message;

determine whether the location configuration message indicates that no location information is expected by the first network node in return;

in response to determining that the location configuration message indicates that no location information is expected by the first network node in return, refrain from transmitting the location information to the first network node and instead transmit, to a third network node that is different from the first network node, the location information; and wherein the first network node is configured by a second network node to send the location configuration message to the terminal device.

38. The method of claim 1, wherein the wireless communication system includes a legacy positioning protocol requiring the terminal device to send the location information to the first node responsive to receiving the location configuration message from the first node.

* * * * *